(12) United States Patent
Lee et al.

(10) Patent No.: US 12,006,698 B2
(45) Date of Patent: Jun. 11, 2024

(54) METAL MATERIAL TO WHICH FLAMMABLE THIN-FILM CONSTRUCTION INTERIOR MATERIAL IS ADHERED, AND ATTACHMENT STRUCTURE FOR ATTACHING SAME

(71) Applicant: SAMWON ACT CO., LTD., Busan (KR)

(72) Inventors: Kyung Wook Lee, Ansan-si (KR); Kyung Yul Lee, Bucheon-si (KR); Hong Suk Han, Siheung-si (KR); Jae Sung Choi, Ansan-si (KR)

(73) Assignee: SAMWON ACT CO., LTD., Busan (KR)

( * ) Notice: Subject to any disclaimer, the term of this patent is extended or adjusted under 35 U.S.C. 154(b) by 274 days.

(21) Appl. No.: 17/623,140

(22) PCT Filed: Jun. 25, 2020

(86) PCT No.: PCT/KR2020/008244
§ 371 (c)(1),
(2) Date: Dec. 27, 2021

(87) PCT Pub. No.: WO2020/262969
PCT Pub. Date: Dec. 30, 2020

(65) Prior Publication Data
US 2022/0356715 A1    Nov. 10, 2022

(30) Foreign Application Priority Data
Jun. 26, 2019   (KR) .................. 10-2019-0076116

(51) Int. Cl.
*E04F 13/08*   (2006.01)
*B32B 3/26*   (2006.01)
*B32B 3/30*   (2006.01)
*B32B 7/12*   (2006.01)

(52) U.S. Cl.
CPC .......... *E04F 13/0866* (2013.01); *B32B 3/266* (2013.01); *B32B 3/30* (2013.01); *B32B 7/12* (2013.01); *E04F 13/0833* (2013.01); *B32B 2307/3065* (2013.01); *B32B 2419/04* (2013.01)

(58) Field of Classification Search
CPC .. E04F 13/0866; E04F 13/0833; B32B 3/266; B32B 3/30; B32B 7/12; B32B 2307/3065
USPC ........................................ 52/506.08
See application file for complete search history.

(56) References Cited

U.S. PATENT DOCUMENTS 10,011,094 B2   7/2018   Brown et al.

FOREIGN PATENT DOCUMENTS

| JP | 2009-56777 A | 3/2009 |
|---|---|---|
| KR | 20-0366473 Y1 | 11/2004 |
| KR | 10-0515187 B1 | 9/2005 |
| KR | 10-2103540 B1 | 4/2020 |

*Primary Examiner* — Mark R Wendell
(74) *Attorney, Agent, or Firm* — Birch, Stewart, Kolasch & Birch, LLP

(57) ABSTRACT

The present invention has the following features. The present invention relates to a flammable flame-proof material provided with a metal material, comprising a metal material and a non-flame-proof-treated thin film sheet on the top of the metal material, wherein an adhesive agent is between the metal material and the non-flame-proof-treated thin film sheet, and relates to an attachment structure for attaching a metal plate with a flammable thin-film construction interior material.

4 Claims, 29 Drawing Sheets

(a)

(b)

(c)

METAL MATERIAL TO WHICH FLAMMABLE THIN-FILM CONSTRUCTION INTERIOR MATERIAL IS ADHERED, AND ATTACHMENT STRUCTURE FOR ATTACHING SAME

CROSS REFERENCE TO RELATED APPLICATIONS

This application is the National Phase of PCT International Application No. PCT/KR2020/008244, filed on Jun. 25, 2020, which claims priority under 35 U.S.C. 119(a) to Patent Application No. 10-2019-0076116, filed in the Republic of Korea on Jun. 26, 2019, all of which are hereby expressly incorporated by reference into the present application.

TECHNICAL FIELD

The present disclosure relates to a metal material with a flammable thin-film construction interior material, and an attachment structure for attaching same.

BACKGROUND ART

In FIG. 11a, the metallic thin films 11 and 11' can be treated with various kinds of colors, so they can be treated with various colors such as even a primary color and a wood texture. Further, the metallic thin films are adhered to both sides of an interior flame-proof noninflammable finishing material, they have a function that can completely block a interior flame-proof noninflammable body 12 from a fire.

A process of forming a V-groove at both ends of a surface of the body 12 using V-groove machining equipment (not shown) is shown, in which cutting is performed at both ends symmetric to each other with the center of the body 12 therebetween. Further, such a V-cutting process is formed at an angle, for example, within the range of about 450±50 with respect to the vertical axis such that inclined surfaces A and A' and V-grooves are formed without cutting the body 12 to which the metallic thin films 11 and 11' are attached. This is because finishing by adhering of the inclined surfaces to each other is made well within the range. A piece of furniture manufactured by performing such V-cutting has an advantage that the external appearance is not only very neat, but strong.

However, since the metallic thin films are adhered to both sides of an interior flame-proof noninflammable finishing material in the description of the related art, they have a function that can completely block a interior flame-proof noninflammable body 12 from a fire. Accordingly, since the metallic thin films completely block the flame-proof noninflammable body, they have a flame-proof function.

Accordingly, it is impossible to show the original texture of the interior instead of having a flame-proof function.

In FIG. 11B, a flame-proof effect is achieved even through flame-proofing is not performed by adhering a metallic thin film 30 to a body 40.

However, since it is surrounded by the metallic thin film 30, there is a defect that it is impossible to show the desired pattern inside the body 40 to the outside.

FIG. 11C is described hereafter.

A metal layer 15 is formed by adhering a metal foil made of metal in a thin film shape to an adhesive layer 140. The metal foil should have an yield point higher than internal stress or restoring force generated in a plastic layer 13, and generally, aluminum, copper, gold, silver, and white gold are used.

FIG. 11C is a perspective cross-sectional view of a marking & decoration sheet attached to a curved surface of an adhesion target material 17. A release paper layer is separated from a sheet 10 and an adhesive layer of the sheet 16 is attached to the curved surface of the adhesion target material 17, whereby construction of the sheet 10 is finished.

The yield point of the metal layer 15 of the sheet 10 is higher than internal stress or restoring force that is generated when the sheet 10 is attached to the adhesion target material 17 having the curved surface. For this reason, even though the sheet 10 is attached to the curved surface, the metal layer offsets the restoring force, so there is an advantage that it is possible to secure an excellent appearance and strong attachment without a space that is formed between a sheet and a curved surface of an adhesion target material in the related art.

However, this related art has an advantage that a space is not formed between curved surfaces due to a metallic thin film, which is different from an objective of the present disclosure.

Further, a space should exist between the metal layer 15 and the adhesion target material 17 such that heat can be dissipated in order to prevent a fire. However, since it is attached by an adhesive layer, heat cannot be dissipated, so there is small effect or little effect against a fire due to the thin metal plate.

The present disclosure is different from a metal material that should have a predetermined thickness because it should be a metallic thin film to be able to the attached to each curved portion.

The corresponding effect is also different.

The subject and effect to be achieved by the present disclosure are made in terms of prevention of a fire.

DISCLOSURE

Technical Problem

A subject of the present disclosure is that when flame-proofing is applied to the surface of a flammable material, deterioration of optical effect and a color change are caused by a change of the surface structure.

In order to solve the defect of a color change of a flammable material through prevention of a fire, the defect is solved by combining a flammable material and a metal material.

The present disclosure solves the subject of showing a flame-proof effect over the same level (which experimentally excellent) as the case of performing flame-proofing on a surface even without performing flame-proofing on a thin film sheet to show a desired pattern of a flammable interior material.

The present disclosure solves a subject of an attachment structure for attaching a metal material, such as aluminum, brass, pure copper, white copper, and phosphorous bronze, when constructing the metal material with a flammable thin-film construction interior material while achieving flame-proof performance at a low cost.

An objective of the present disclosure is to configured an attachment structure for attaching a metal material in a one-touch type in order to make work efficient.

The present disclosure solves a subject of minimizing the construction cost at a site and maintaining the quality such as flatness by bolting the structure for attaching a metal material, with a flammable thin-film construction interior material, to a flat wall surface and by assembling a metal material with a flammable thin-film construction interior material thereon.

Another objective of the present disclosure is to remarkably improve an interior environment by removing a harmful adhesive or an excessive construction process.

Further, the present disclosure solves a subject of making work very efficient because it is possible to finish work within a short time when finishing corners, edges, etc. by configuring an attachment structure for attaching a unit metal material in a small unit size.

Technical Solution

The following configuration is provided to solve the subjects described above.

There is provided a metal material with a flammable thin-film construction interior material in which a non-flame-proof-treated thin film sheet is configured on a metal material, and an adhesive layer is configured between the metal material and the non-flame-proof-treated thin film sheet.

It is preferable that the adhesive layer is configured on the rear surface of the non-flame-proof-treated thin film sheet and is adhered to the metal material.

It is preferable that the non-flame-proof-treated thin film sheet is one of a fabric, a wood film, a cork film, a polymer film, Korean paper, and leather.

The metal material is any one such as steel, aluminum, copper, and magnesium as long as it is an inflammable material having high thermal conductivity.

It is preferable that the metal material is a metal plate having a thickness of 0.3t~1.2t.

It is preferable that an adhesive of the adhesive layer is synthetic rubber of epoxy, polyester, acryl, vinyl acetate, phenol, urea, melamine, and xylene.

Further, it is preferable that the metal material has a tile structure to be attached to a ceiling or a wall.

In this case, an insertion end is configured by bending four ends of the metal material in one direction in a right angle shape.

A coupling protrusion hole is configured at the insertion ends.

It is preferable that a connection portion groove is configured adjacent to the coupling protrusion hole.

Further, a structure of a wall attachment portion bolt groove is provided to attach the metal material with a flammable thin-film construction interior material.

Coupling protrusions are configured at an outermost portion to couple the coupling protrusions.

Connectors configured to connect a plurality of structures for attaching the metal material with a flammable thin-film construction interior material to each other to correspond to coupling stepped portions of the connectors configured at connection portion grooves of the metal material are provided.

In this case, it is preferable that insertion ends are configured at four ends of the metal plate.

In this case, it is preferable that the metal material has a tile structure to be attached to a ceiling or a wall.

An attachment for attaching a metal material with a flammable thin-film construction interior material, which has wall attachment portion bolt grooves having insertion portions corresponding to the insertion ends to attach a metal material with a flammable thin-film construction interior material to a wall surface is configured.

In this case, it is preferable to configure the coupling protrusion at the left and right of the connector.

In this case, it is preferable that the attachment structures are connected to each other in a rib type on the inner surfaces of openings of the connectors to make the connectors firm.

The structure for attaching a metal material with a flammable thin-film construction interior material is configured in a rectangular shape, and the coupling protrusions are configured on the outer surface of the rectangle.

It is preferable that the metal material with the flammable thin-film construction interior material is configured to be biased to one of adjacent sides of the edges of the rectangle.

Two coupling protrusions are configured at each side of the rectangle and it is preferable that a coupling protrusion is configured close to a corner on one of two sides connected to the corner and a coupling protrusion is configured far from the corner on the other side.

In this case, it is preferable to manufacture and configure four unit attachment structures at a time when manufacturing the attachment structure for attaching the metal material with a flammable thin-film construction interior material.

In this case, it is preferable that an insertion space of the metal material is configured by configuring a coupling stepped portion at the connector.

In this case, it is preferable to configure coupling avoidance spaces on the opposite side to the coupling protrusions to secure avoidance spaces when coupling the coupling protrusions to the metal material.

Advantageous Effects

The present disclosure shows a flame-proof effect over the same level as the case of performing flame-proofing on a surface even without performing flame-proofing to show a desired pattern of a flammable interior material.

In order to solve the defect caused by deterioration of optical effect and a color change due to a surface structure change when flame-proofing is performed on the surface of a flammable material, a flammable material and a metal material are combined, whereby there is an effect of removing the defect.

An attachment structure for attaching a metal material with a flammable thin-film construction interior material is manufactured to construct a flammable flame-proof material having a metal material in a one-touch type to make work efficient.

Another effect is to minimize the construction cost at a site and maintain the quality such as flatness by bolting a attachment structure to a flat wall surface and by assembling a metal material of aluminum, etc. attached with a flammable thin-film construction interior material thereon.

Another effect is to achieve competitiveness in the market by remarkably reducing the construction cost in the process of constructing a metal material with a flammable thin-film construction interior material, by simplifying the construction process.

Flame-proof performance is secured by using a metal material with a flammable thin-film construction interior material.

Since a unit metal material attachment structure is configured in a small size, it is possible to complete the work of finishing corners, that is, edges, etc. within a short time, so work can be efficiently performed.

DESCRIPTION OF DRAWINGS

First.

FIG. 1 shows the size of a sample and vertically fixing the sample.

FIG. 2 is a view showing a flame-proof performance test result according to a common material, a flame-proof material, and a steel plate attachment material sequentially from the left to the right to artificial fiber DK 860.

BEST MODE

Figure 9:
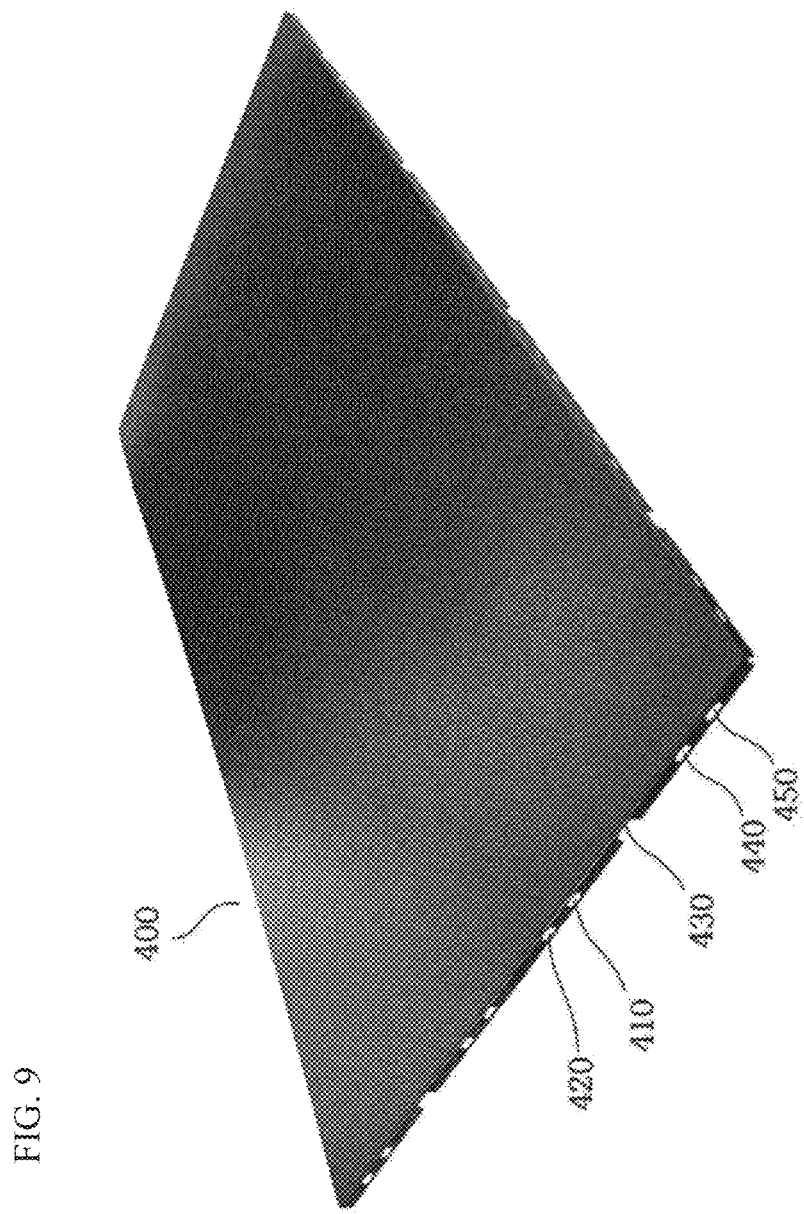
FIG. 9 is a view showing the configuration of a metal material with a flammable thin-film construction interior material.

FIG. 9 is a view showing a configuration in which a metal material with a flammable thin-film construction interior material 400 is attached to a partial wall surface by an attachment structure 100.

An insertion end has only to be formed at four ends of a metal material.

In order to attach a metal material with a flammable thin-film construction interior material, a structure that has a wall attachment portion bolt groove having an insertion portion corresponding to the insertion end and to which a flammable thin-film construction interior material has only to be configured.

The more the space is secured between a rear surface of the metal material and a wall surface, the more the air layer, which is advantageous in heat transfer.

An attachment portion of a bracket and the metal material is configured such that an air layer is secured in consideration of this point.

FIG. 9 shows a detailed embodiment.

The following embodiment should not be construed as limiting the right range.

An attachment structure 100 having wall attachment portion bolt grooves 141, 142, 143, and 144 for attaching a metal material with a flammable thin-film construction interior material 400, is configured.

Coupling protrusions 110, 112, 114, 116, and 118 are configured on an outermost portion of the attachment structure 100 configured to couple coupling protrusion holes 410, 420, 440, and 450.

A connection portion groove 430 of the metal material 500 is configured to correspond to a coupling stepped portion 355 of a connector 350.

The attachment structure 100 has connection portion holes 130 configured to connect a plurality of attachment structures 100.

It is preferable to configure the coupling protrusions 110, 112, 114, 116, and 118 at the left and right of the connection portion hole 130.

It is preferable that they are connected to each other in a rib shape on the inner surface of connection portion hole opening 131 to make the connection portion hole 130 firm.

The attachment structure 100 is configured in a rectangular shape and the coupling protrusions 110, 112, 114, 116, and 118 are configured on the outer surface of the rectangle.

It is preferable that they are configured to be biased to one of adjacent sides of the corners of the rectangle.

The coupling protrusions 110, 112, 114, 116, and 118 are provided as two for each of the sides of the rectangle. It is preferable that the coupling protrusions 110, 112, 114, 116, and 118 are configured close to a corner on one of two sides connecting to the corner and configured relatively far from the corner on the other side.

It is preferable to manufacture and configure four unit attachment structures 100 at a time when manufacturing the attachment structure 100.

It is preferable to configure an insertion space of the metal material 500 by configuring a coupling stepped portion 355 at the connector 300.

It is preferable to configure a coupling avoidance space 115 at the opposite side to the coupling protrusions 110, 112, 114, 116, and 118 to secure an avoidance space when the coupling protrusions 110, 112, 114, 116, and 118 are coupled to the metal material 500.

Figure 10A:
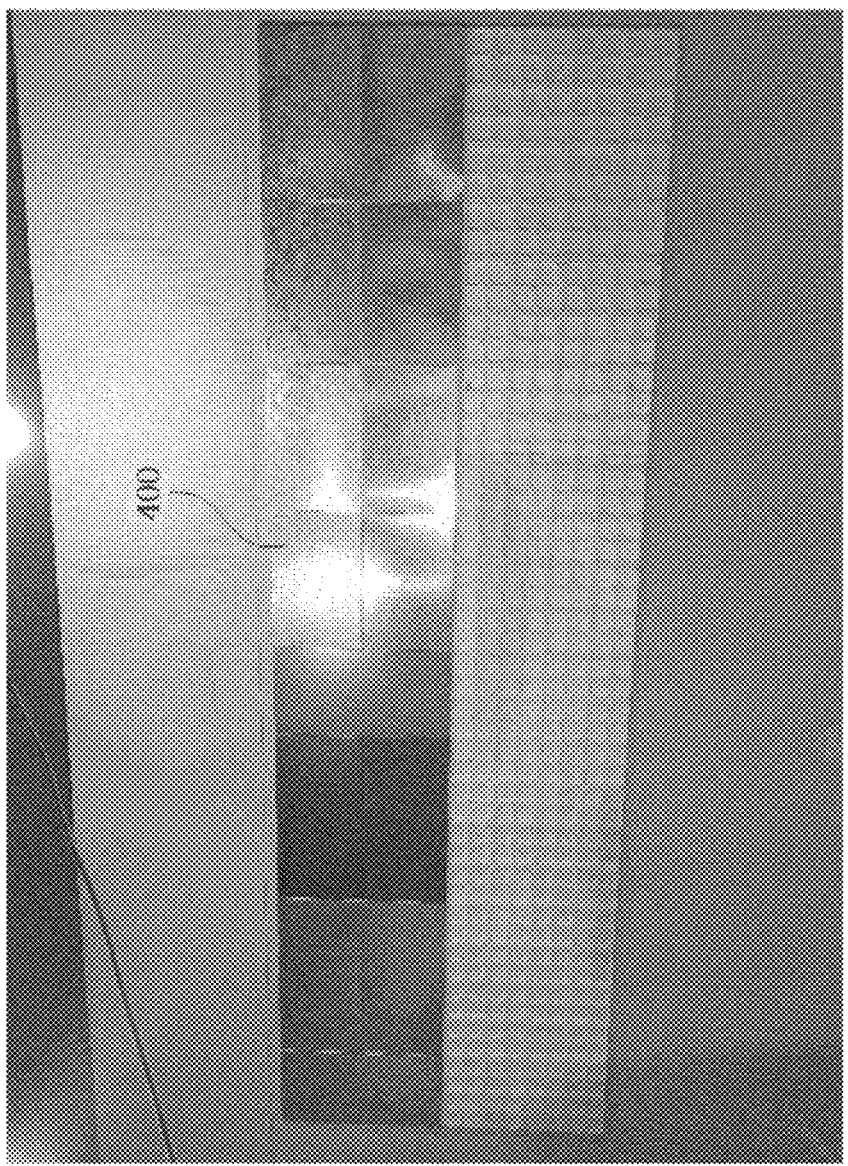
FIG. 10a is a view showing a work process of attaching a metal material, to which with a flammable thin-film construction interior material, to an attachment structure of FIG. 8.
Figure 10B:
FIG. 10b is a view showing attaching a metal material, to which with a flammable thin-film construction interior material, to an entire surface on which the attachment structure of FIG. 10a is configured.
Figure 10C:
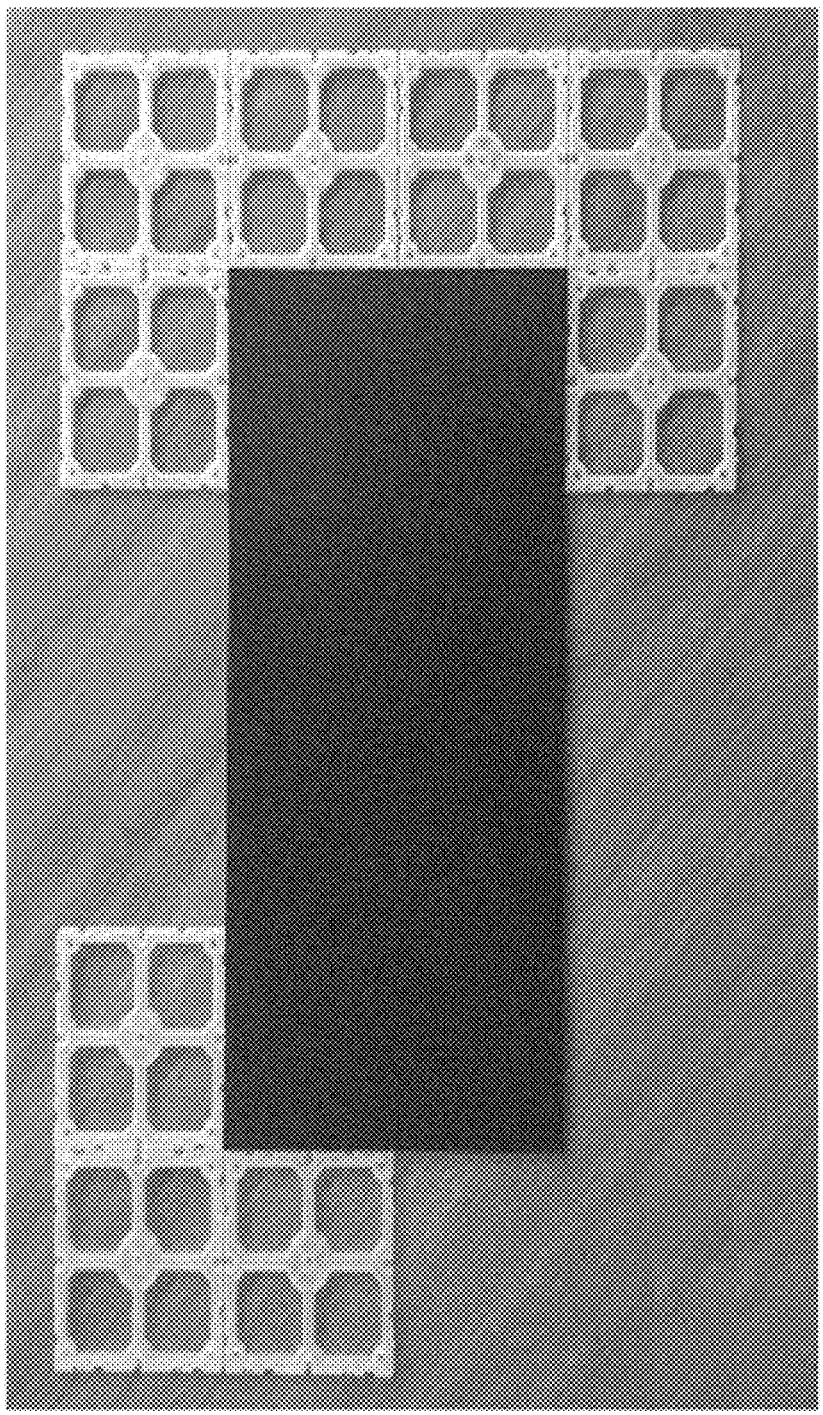
FIG. 10c is a view showing configuring an attachment structure on a partial surface of a wall and attaching a metal material with a flammable thin-film construction interior material.
Figure 11A:
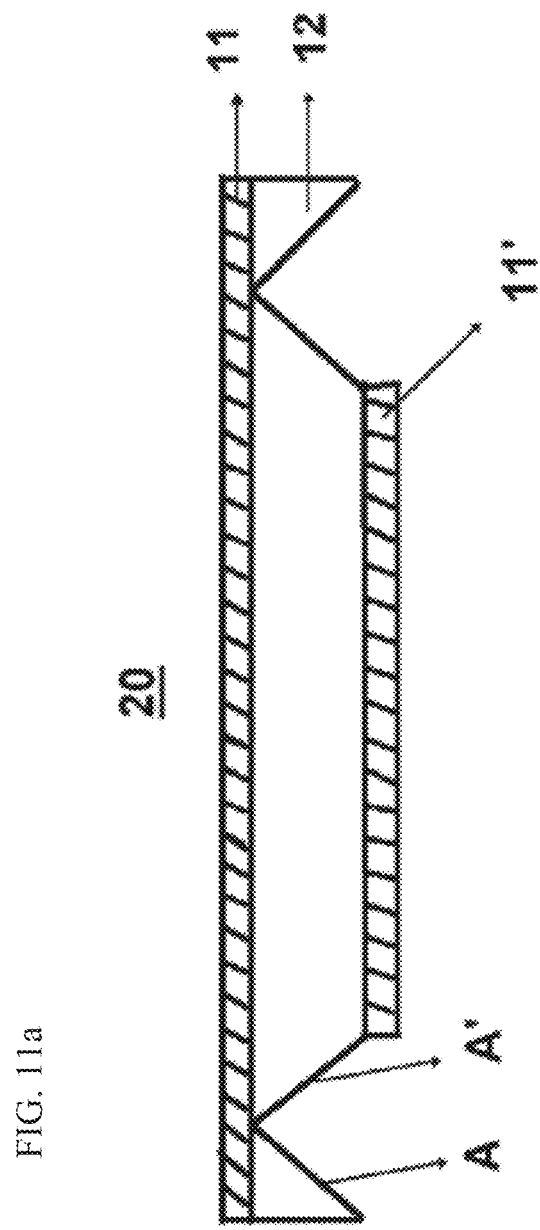
FIGS. 11a to 11c are views showing the related art.
Figure 11B:
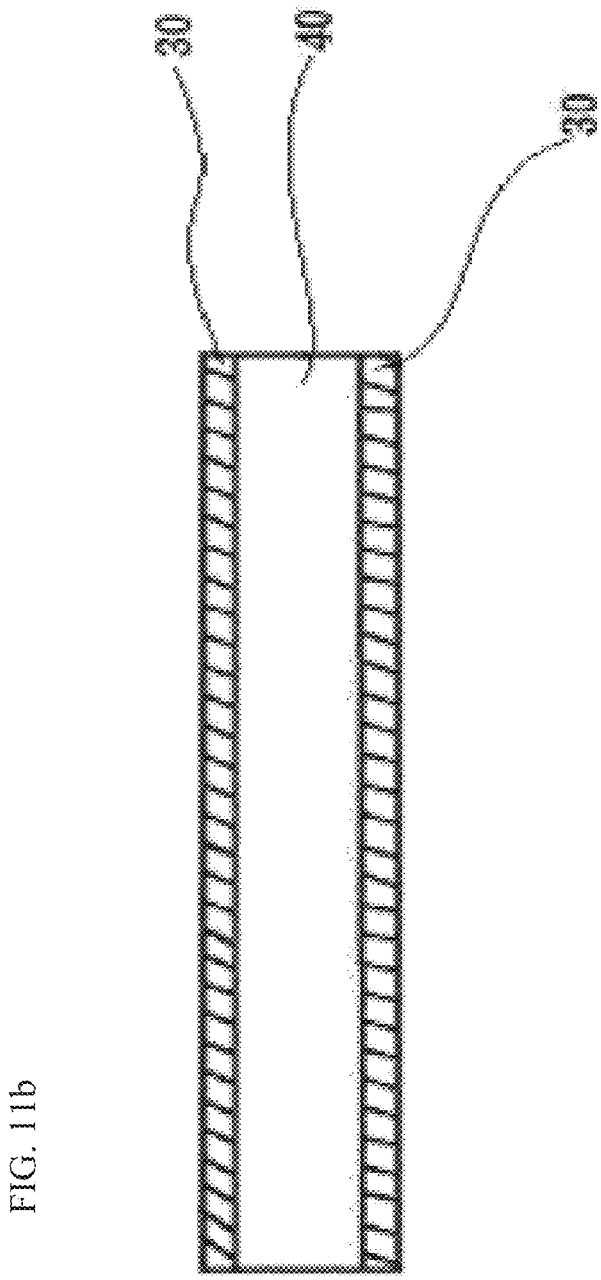
Figure 11C:
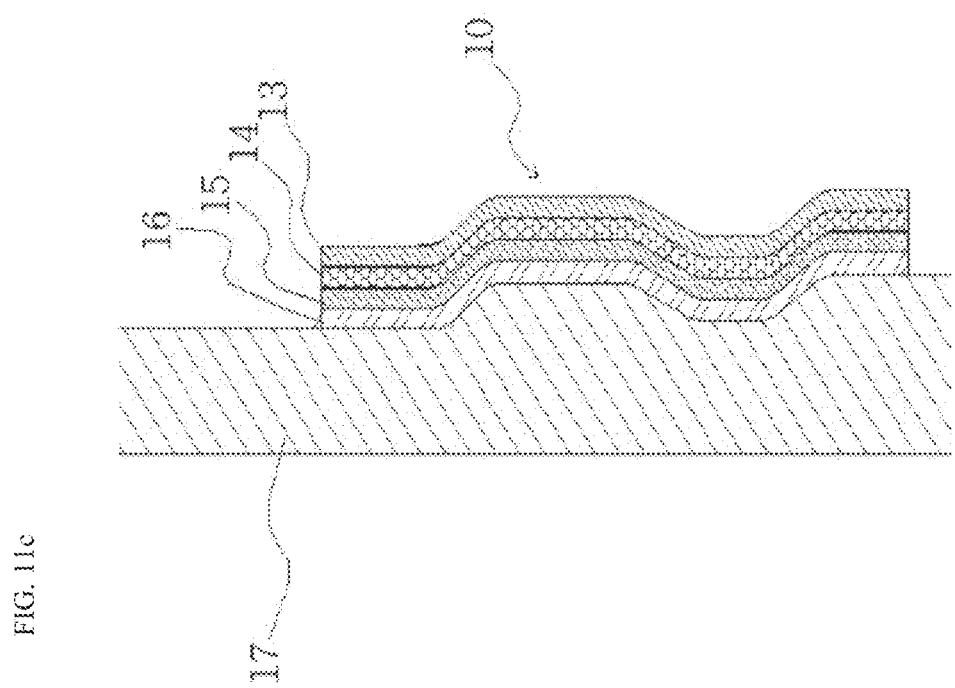

FIGS. 10a, 10b, and 10c are described hereafter.

As described above, in FIG. 10c, the attachment structures 100 are configured to be coupled at ends of a metal support layer without being sequentially arranged.

In order to allow this configuration, the coupling protrusions 110, 112, 114, 116, and 118 of the attachment structure 100 are configured not to be symmetric at corners and grooves of the metal material is sufficiently configured in FIG. 9.

Figure 8:
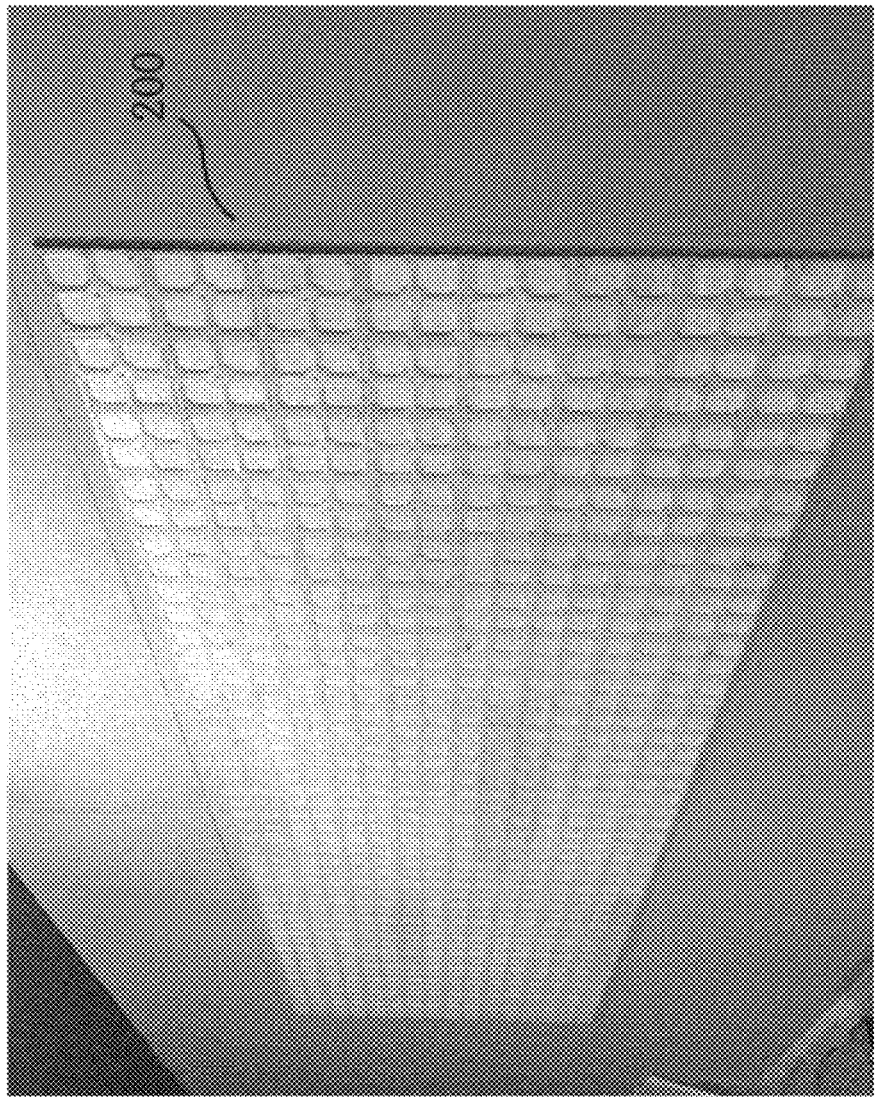
FIG. 8 is a view showing that an attachment structure is attached to a wall surface.

FIG. 10a is a view showing a process of attaching a metal material with a flammable thin-film construction interior material in FIG. 8.

FIG. 10b is a view showing that a metal material with a flammable thin-film construction interior material is finished being attached.

MODE FOR INVENTION

Description based on drawings is as follows. The present disclosure relates to a flame-proof interior material having a metal material with a flammable thin-film construction interior material.

As a flammable material, there are a fabric, a wood film, a cork film, a polymer film, etc. It is preferable that the metal material has a plate material shape. When the metal material and the flammable material are adhered, thermosetting resin is used, in which synthetic rubber of epoxy, polyester, acryl, vinyl acetate, phenol, urea, melamine, xylene, etc. is used as the adhesive for adhering the flammable material and the metal material.

A plate material of 0.3t~1.2t of steel, aluminum, copper, magnesium, etc. is used as the metal material and has only to prevent flame transmission and secure the function of a metal support structure.

The metal structure may have a tile structure for ceiling and wall attachment structure.

The present disclosure has the following effects.

In general, when a flammable material is used for construction, it is a factor corresponding to necessary work to performing flame-proofing on the basis of the relevant construction rules of each country.

However, a first defect of a flame-proof material to which flame-proofing is applied is that a substance added with a halogen component produces noxious gas containing halogen in a fire, so the flame-proofed material causes casualties.

A second defect of a flame-proofed material is that when flame-proofing is performed on a flammable material, deterioration of optical effect and a color change is caused by a surface structure change, so a color changes due to fire prevention.

The present disclosure satisfies the references required by construction rules through heat transfer diffusion of a metal structure even without applying a flame-proof material to the surface of a flammable material or performing an impregnation process of a flame-proof material.

1-5 of Article 4 that is a flame-proof reference by Korean National Fire Agency is as follows.

"5. The flame-proof reference of plywood, fiber plates, wood materials, and other products (hereafter, referred to as "plywood, etc." should satisfy an after flame time within 10 seconds, a glow time within 30 seconds, a carbonization area within 50 cm², and a carbonization length within 20 cm" is described.

It was found out that the test report of tests requested by the present disclosure satisfies all of the conditions.

A satisfactory effect is achieved in a smoke density test.

Figure 1:
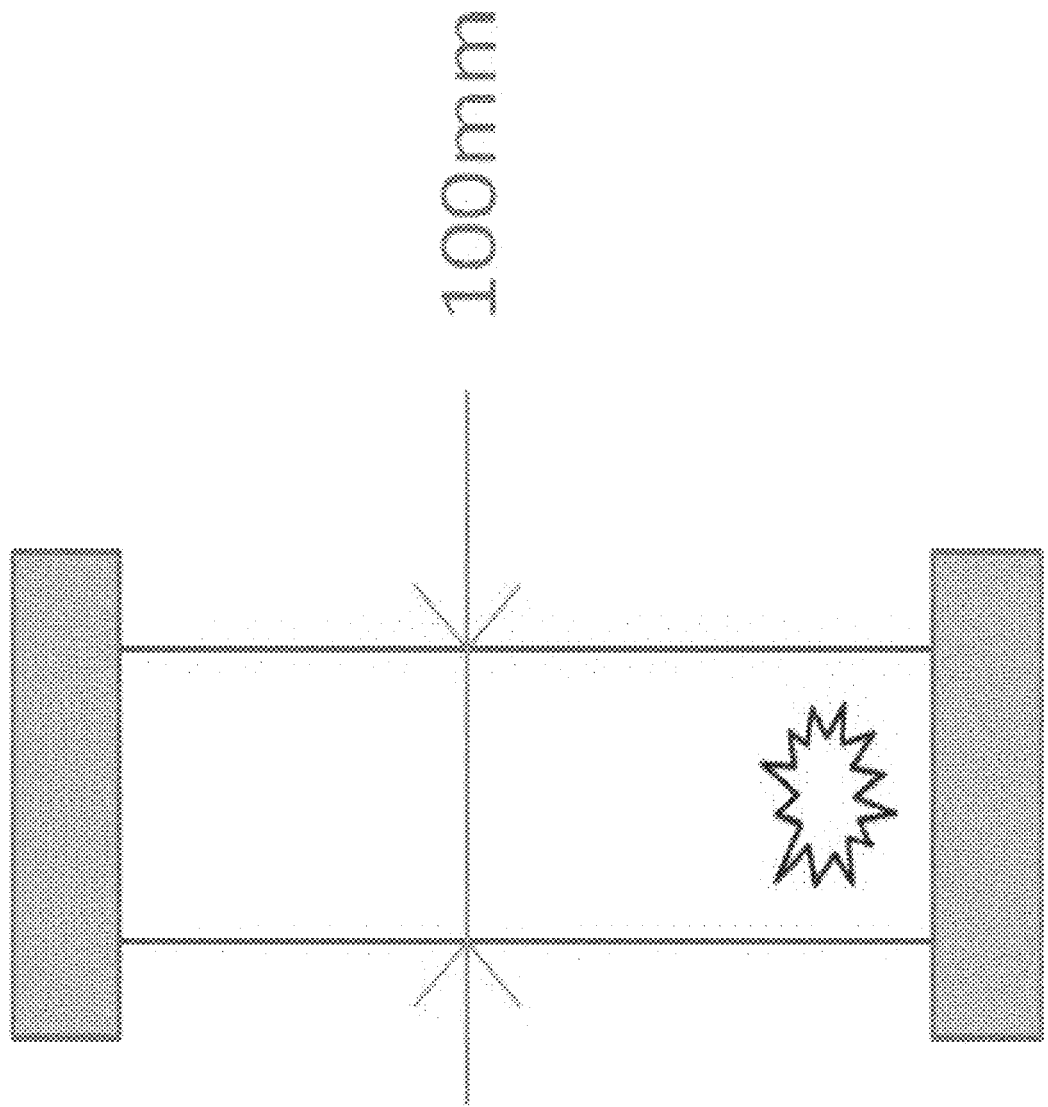
FIGS. 1 and 2 show flame-proofing test results using DK 860, which is a kind of artificial fibers, and Forest, which is a kind of natural fibers, as samples.
Figure 2:
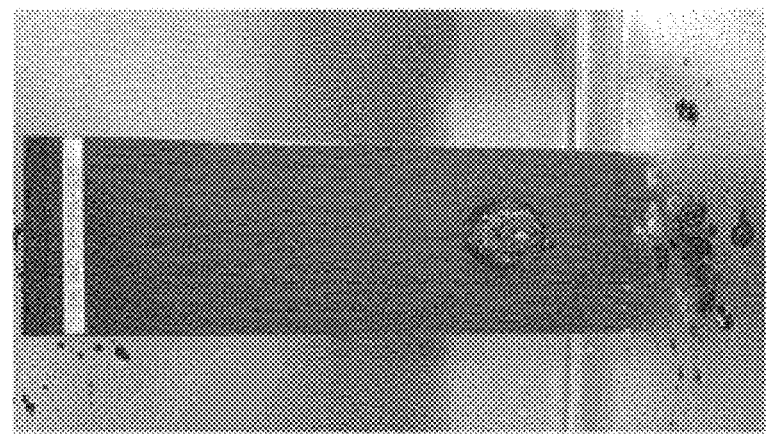
Figure 2:
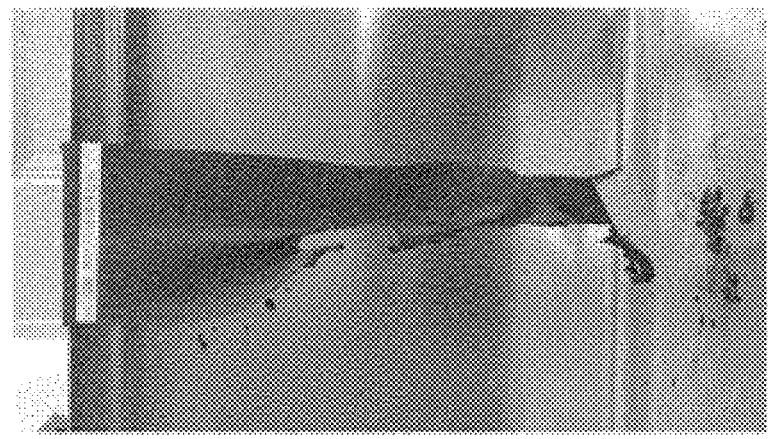
Figure 2:
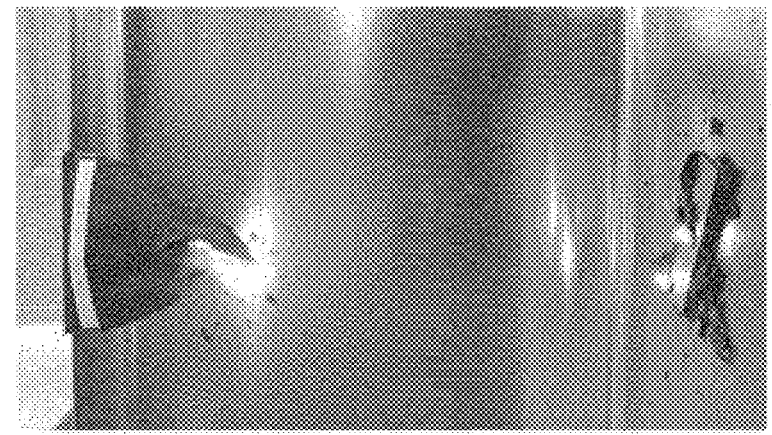
Figure 3:
FIG. 3 is a view showing a flame-proof performance test result according to a common material, a flame-proof material, and a steel plate attachment material sequentially from the left to the right to natural fiber Forest.
Figure 3:
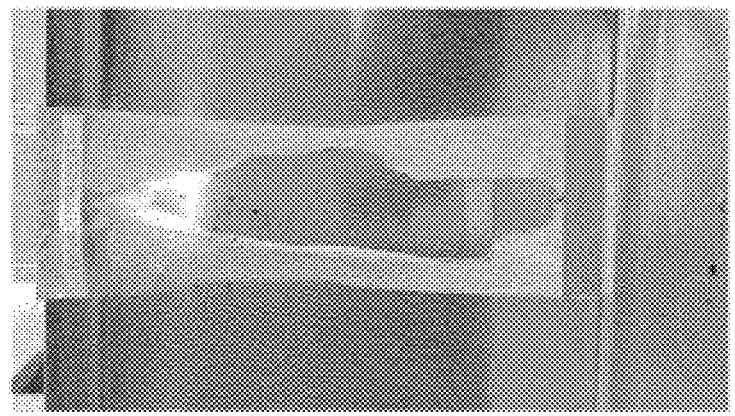
Figure 3:
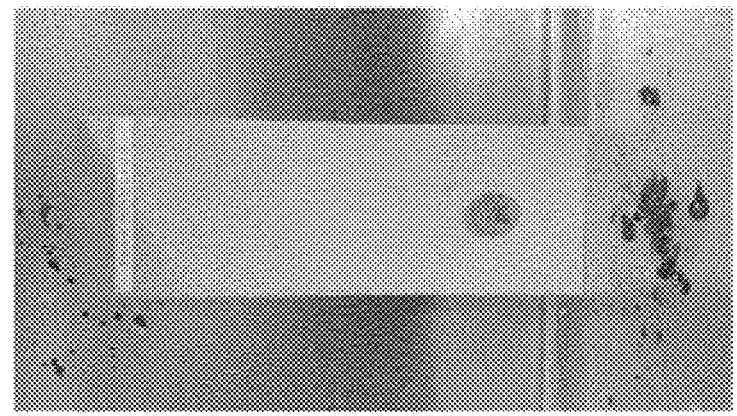

First, FIGS. 1, 2, and 3 show flame-proofing test results using DK860, which is a kind of artificial fibers, and Forest, which is a kind of natural fibers, as samples.

Description referring to FIGS. 1 to 3 is as follows.

The following procedure is performed as a test procedure for a fiber material flame-proof performance test.

A sample with a 100 mm width is vertically fixed and the lower end is burned using a gas torch, and then the combustion aspect is observed and whether there is self-extinguishing is checked as a main observation matter.

The test materials were two kinds of DK860 and Forest, and a total of 6 samples of a common material, a flame-proofed material, and a steel plate attachment material were tested.

FIG. 2 shows the size of a sample and vertically fixing the sample.

The width of the sample was 100 mm.

FIG. 2 is a view showing flame-proof performance test results on (a) a common material, (b) a flame-proofed material, and (c) a steel plate attachment material sequentially from the left to the right for DK860 that is a kind of chemical fibers.

It is observed that most fiber materials of the common material (a) was burned and there was no self-extinguishing.

The flame-proofed material (b) was observed as having self-extinguishing, but a large portion was burned, so there is a defect that the flame-proofed material produces noxious gas containing halogen, so the flame-proofed material may cause casualties.

It can be seen that not only the steel plate attachment material (c) has self-extinguishing, a trace remains only at the portion corresponding to the diameter of the torch flame.

It can be seen that the steel plate attachment material has an extinguishing portion very smaller than that of the flame-proofed material and has a very excellent characteristic against a fire.

Table 1 is the result of a test in which DK 860R that is a non-flame-proofed fiber that is a kind of an artificial fiber was attached to a steel plate.

Test conditions: temperature (20.0±15.0) ° C. and humidity (50±30)% R.H.

Test method: Based on Article 7 of flame-proof performance reference (2019-2 by Korean National Fire Agency)

TABLE 1

| Test item | Test reference | Test result First time | Second time | Third time | Remarks |
|---|---|---|---|---|---|
| After flame time | Within 10 sec. | 0.0 | 0.0 | 0.0 | |
| Glow time | Within 30 sec. | 0.0 | 0.0 | 0.0 | |
| Carbonization area | Within 50 cm² | 14.7 | 14.5 | 14.8 | |
| Carbonization length | Within 20 cm | 4.6 | 4.5 | 4.6 | |

Not only the tests passed all of the test references, but the after flame time and the glow time were zero in all of the three tests. It can be seen that the carbonization area and the carbonization length are also ⅕~⅓ of the test reference and the flame-proof performance is very excellent.

Table 2 is the result of a test in which Forest that is a non-flame-proofed fiber that is a kind of a natural fiber was attached to a steel plate.

Test conditions: temperature (20.0±15.0) ° C. and humidity (50±30)% R.H.

Test method: Based on Article 7 of flame-proof performance reference (2019-2 by Korean National Fire Agency)

TABLE 2

| Test item | Test reference | Test result First time | Second time | Third time | Remarks |
|---|---|---|---|---|---|
| After flame time | Within 10 sec. | 0.0 | 0.0 | 0.0 | |
| Glow time | Within 30 sec. | 0.0 | 0.0 | 0.0 | |
| Carbonization area | Within 50 cm² | 20.2 | 20.6 | 20.1 | |
| Carbonization length | Within 20 cm | 5.5 | 5.6 | 5.5 | |

Not only the tests passed all of the test references, but the after flame time and the glow time were zero in all of the three tests. It can be seen that the carbonization area and the carbonization length are also ¼~⅓ of the test reference and the flame-proof performance is very excellent.

Table 3 is a test of smoke density as the result of a test in which DK 860R that is a non-flame-proofed fiber was attached to a steel plate.

TABLE 3

| Test item | Test reference | Test result 1 | 2 | 3 | Remarks |
|---|---|---|---|---|---|
| Smoke density test | $Dm_{(corr)}$ 400 or less | 48.2 | 51.2 | 53.1 | ASTME 662-25 $kW/m^2$- Flamingmode |

It can be seen that Table 3 corresponds to the level of about ⅛ of the test reference and the flame-proof performance is very excellent.

Table 4 is the result of a test in which Forest that is a non-flame-proofed fiber that is a kind of natural fiber was attached to a steel plate.

TABLE 4

| Test item | Test reference | Test result 1 | 2 | 3 | Remarks |
|---|---|---|---|---|---|
| Smoke Density test | $Dm_{(corr)}$ 400 or less | 50.7 | 53.4 | 54.9 | ASTME 662-25 $kW/m^2$- Flamingmode |

A result similar to that of Table 3 was derived in Table 4. It can be seen that it corresponds to the level of about ⅛ of the test reference and the flame-proof performance is very excellent.

Flame-proofing tests on artificial and natural fibers and flame-proof performance through heat transfer simulation as the theoretical background in Table 1 to Table 4 are the results of information technology and qualification requested to KFI (Korean Fire Institute) that is an official authentication agency for a flame-proofing test that is only in Korea.

FIG. 3 is a view showing flame-proof performance test results on (a) a common material, (b) a flame-proofed material, and (c) a steel plate attachment material sequentially from the left to the right for Forest that is a kind of natural silk.

It is observed that most fiber materials of the common material (a) was burned and there is no self-extinguishing.

The flame-proofed material (b) was observed as being non-self-extinguishing and a large portion was burned, so there is a defect that the flame-proofed material produces noxious gas containing halogen, so the flame-proofed material may cause casualties.

It was observed that not only the steel plate attachment material (c) has self-extinguishing, a trace remains only at the portion corresponding to the diameter of the torch flame.

It can be seen that the steel plate attachment material has an extinguishing portion very smaller than that of the flame-proofed material and has a very excellent characteristic against a fire.

Whether there is self-extinguishing is shown in the following table.

TABLE 5

| Item | Common | Flame-proofed | Steel plate attached |
|---|---|---|---|
| DK860 | Yes | Yes | Yes |
| Forest | No | No | Yes |

The following conclusion was derived from the flame-proof performance test on fiber materials.

Self-distinguishing was not found from the common material.

Both of two cases with and without self-extinguishing existed in the flame-proofed material.

That is, it was found that DK860 has self-extinguishing when flame-proofing is performed, but Forest does not have self-extinguishing even though flame-proofing is performed.

It was found that although flame-proofing is not performed, in both cases, the steel plate attachment material is not easily burned, the burned portion occupies a very small area, and there is self-extinguishing.

Further, FIGS. 4 and 5 show a heat transfer simulation result when polyester that is a kind of an artificial fibers and a wood fiber that is a kind of natural fibers were used as samples.

FIGS. 4a to 4f are views showing heating tests when polyethylene is attached or not to a steel plate.

The properties and conditions are as follows. The density, thermal conductivity, and specific heat of polyester are 940 $kg/m^3$, 0.46 W/m·K, and 2300)/kg·K, the thermal conductivity of the adhesive is 3 W/m·K, and it is assumed that the density, thermal conductivity, and specific heat of the steel are 7800 $kg/m^3$, 0.45 W/m·K, and 500 J/kg·K.

Figure 4A:
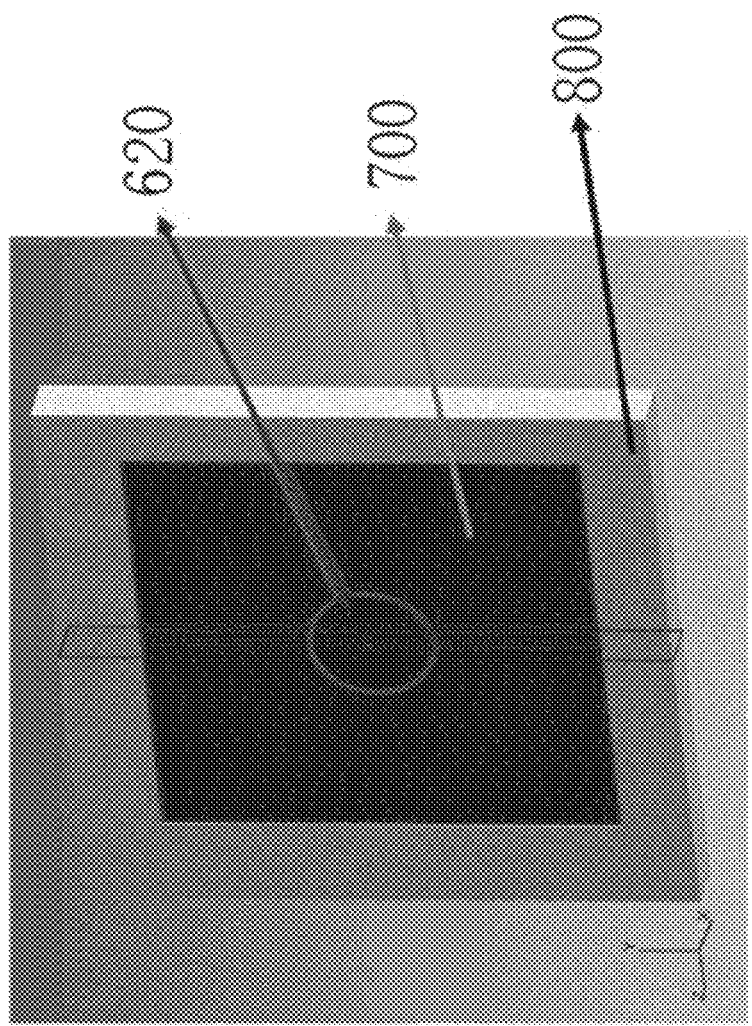
FIGS. 4a to 4f are views showing heating tests when polyethylene that is a kind of artificial fibers is attached or not to a steel plate.

FIG. 4a is entire modeling, in which the heated portion is 20,000 $W/m^2$ and the material is polyethylene of 75×75× 0.05 $mm^3$, it is assumed that there is no air in the surrounding.

The object showing the heated portion 620 and attached to the steel plate is a polyethylene material 700, and the surrounding 800 is composed of air.

It can be considered that only a small portion of the heated portion 620 is heated.

It can be seen that heat is quickly diffused to the atmosphere by the steel plate.

Figure 4B:
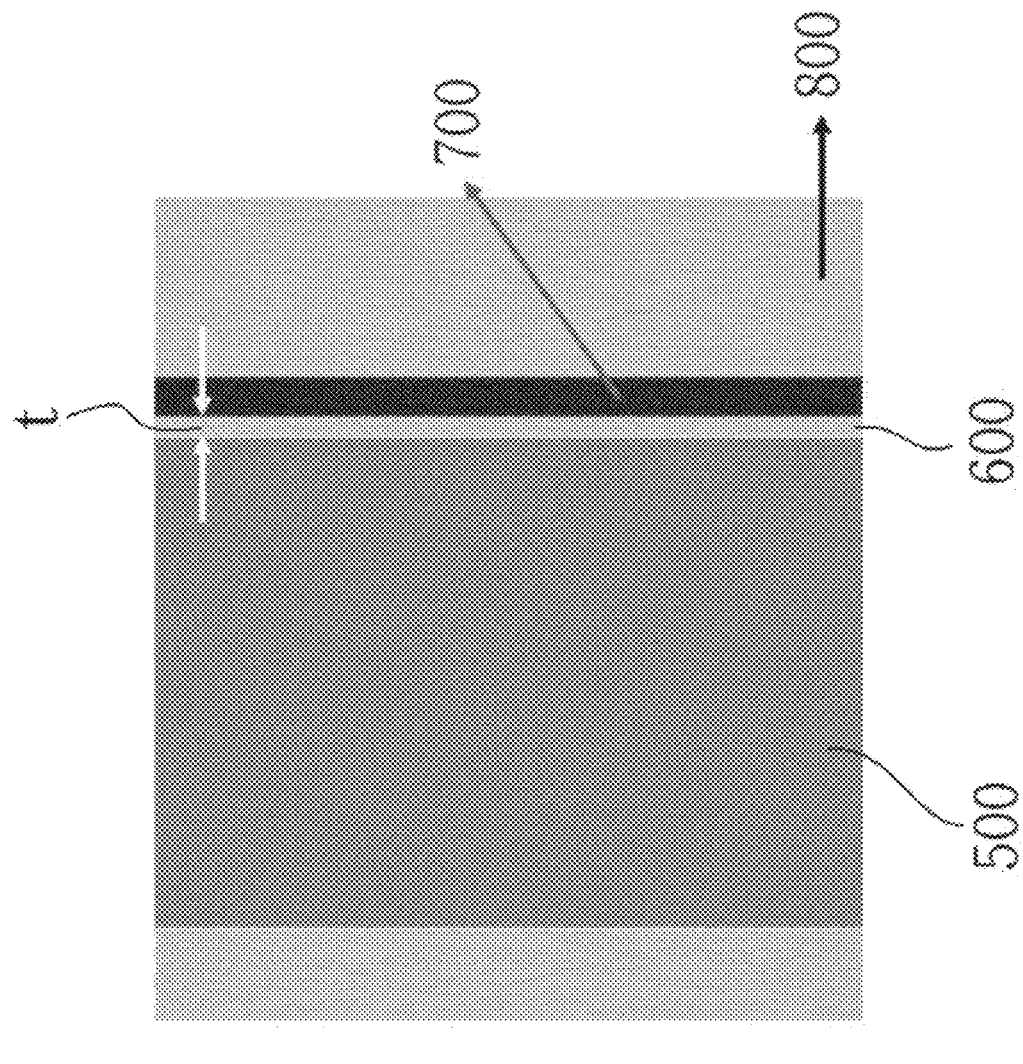

FIG. 4b is an enlarged view of a Z-axial cross-section of FIG. 4a, in which the thickness gap t of an adhesive 600 is 0.25 mm, the steel plate is a metal material 500 of 75×75× 0.6 $mm^3$, and the material is a polyethylene material 700 of which the size is the same as that of FIG. 4a.

Figure 4C:
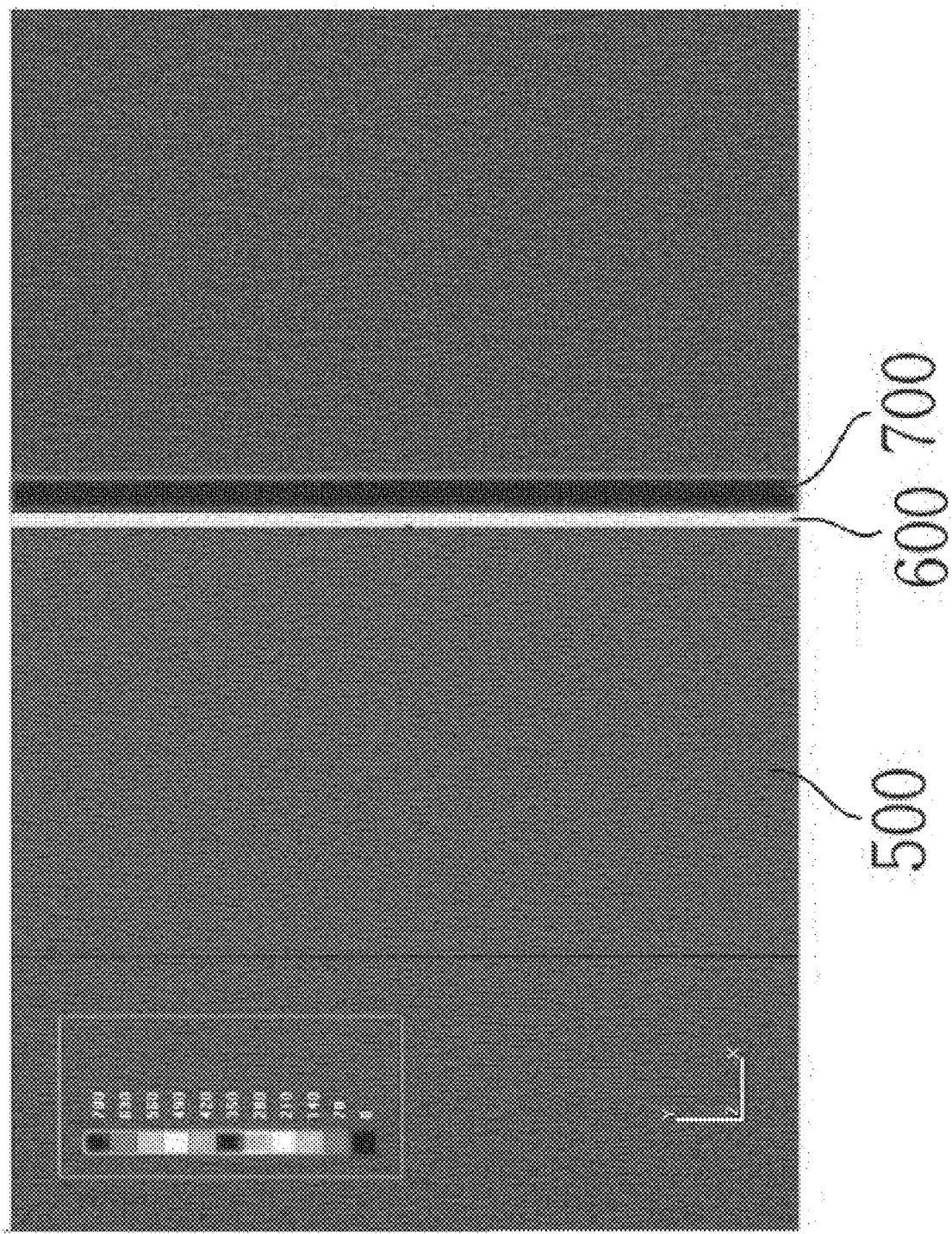

In FIG. 4c, the temperature of the metal material 500 of the steel plate after heating is 39.1° C. and the temperature of the polyethylene material is 345.7° C.

It can be seen that heat by a flame of the material quickly transfers through the metal plate.

Figure 4D:
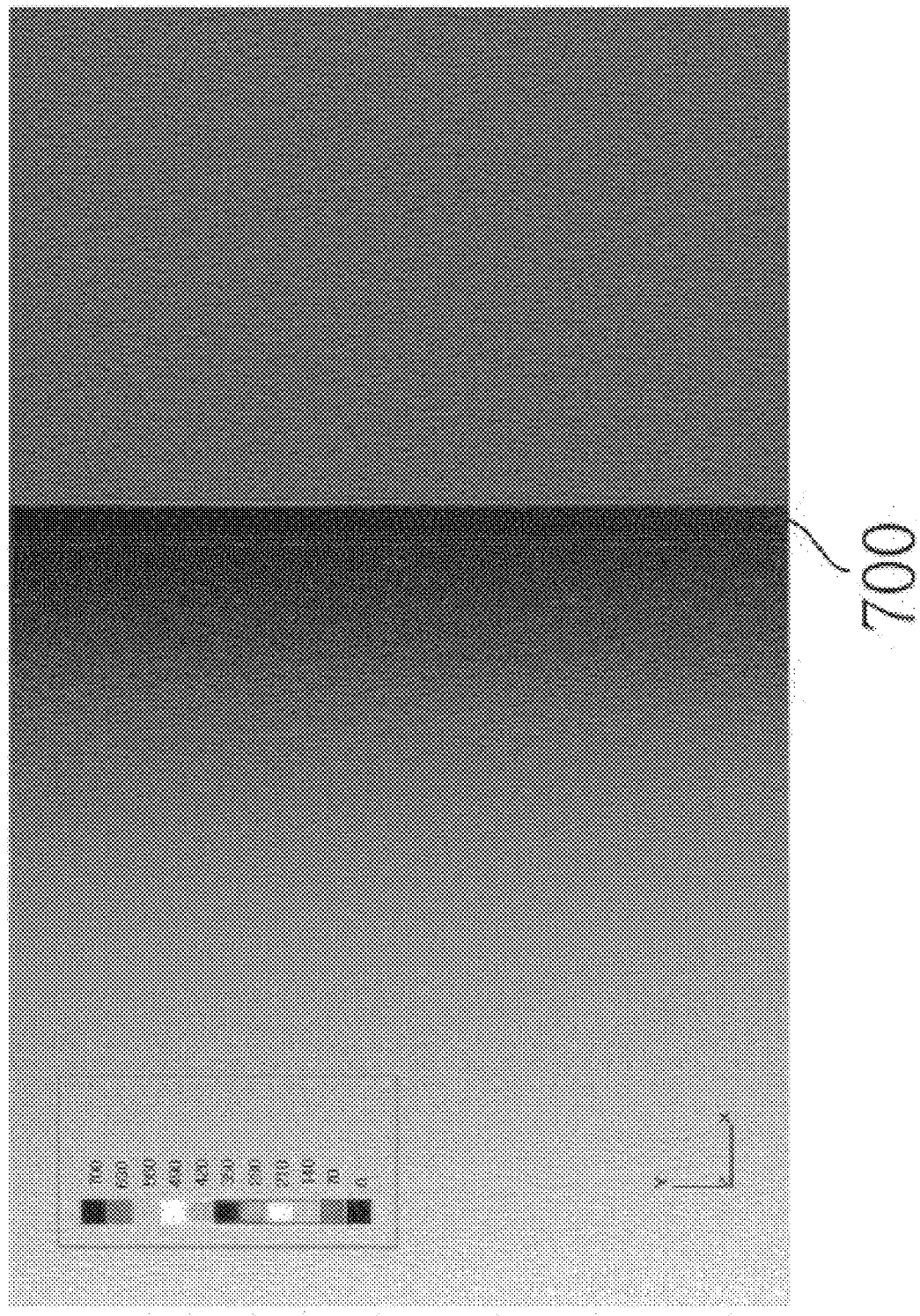
Figure 4E:
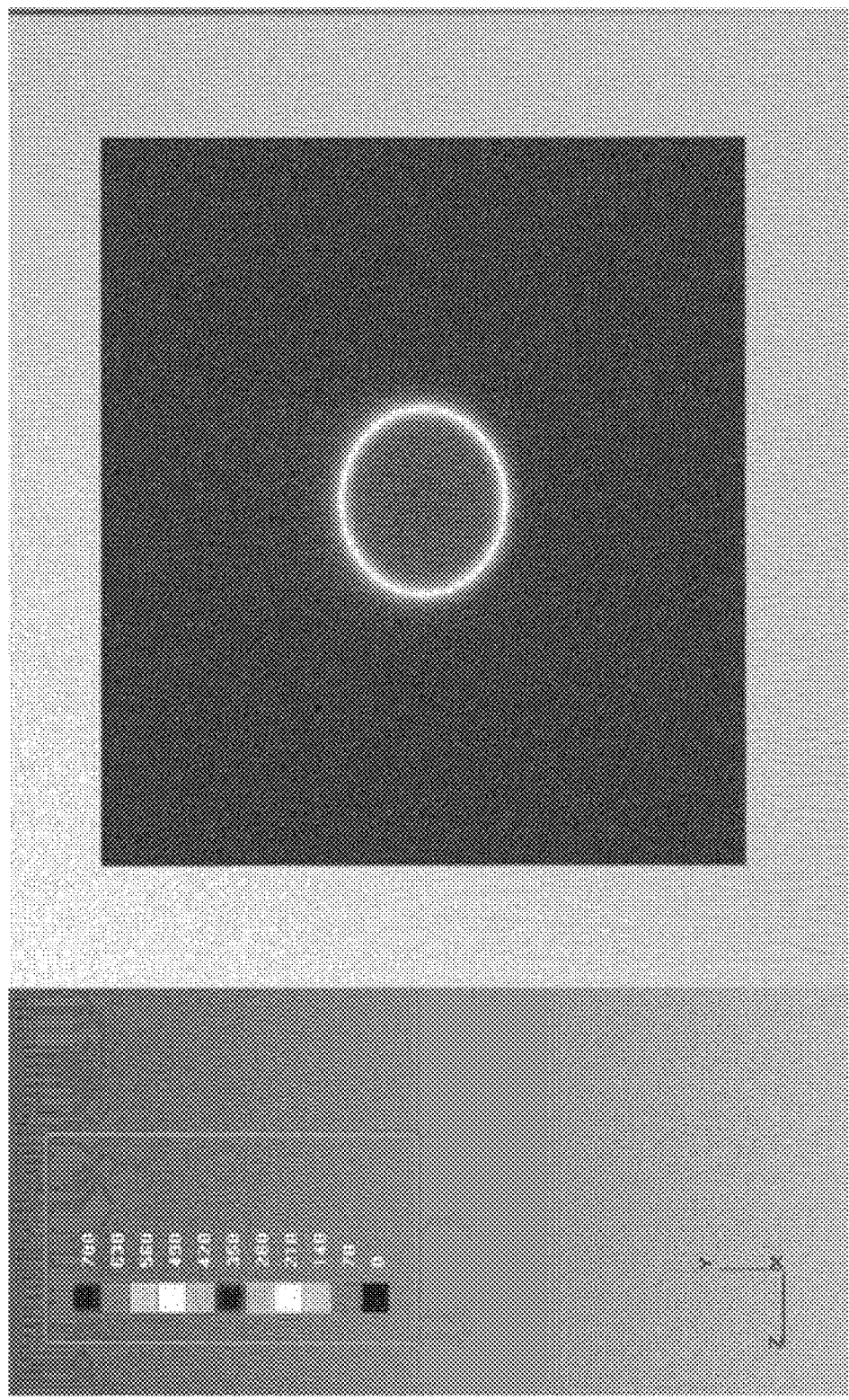

In FIG. 4d, the temperature of the polyethylene material 700 increases up to 725.7° C. after heating when there is no steel plate.

It can be seen from the difference of temperature in FIGS. 4c and 4d due to whether there is a steel plate that the temperature of the flame of the material quickly transfers to the metal plate.

FIG. 4d shows a portion showing a heated temperature when there is a steel plate.

The reference showing temperature is shown at the left upper portion.

Accordingly, it can be seen that the temperature is low around about 300 degrees when there is no steel plate.

Figure 4F:
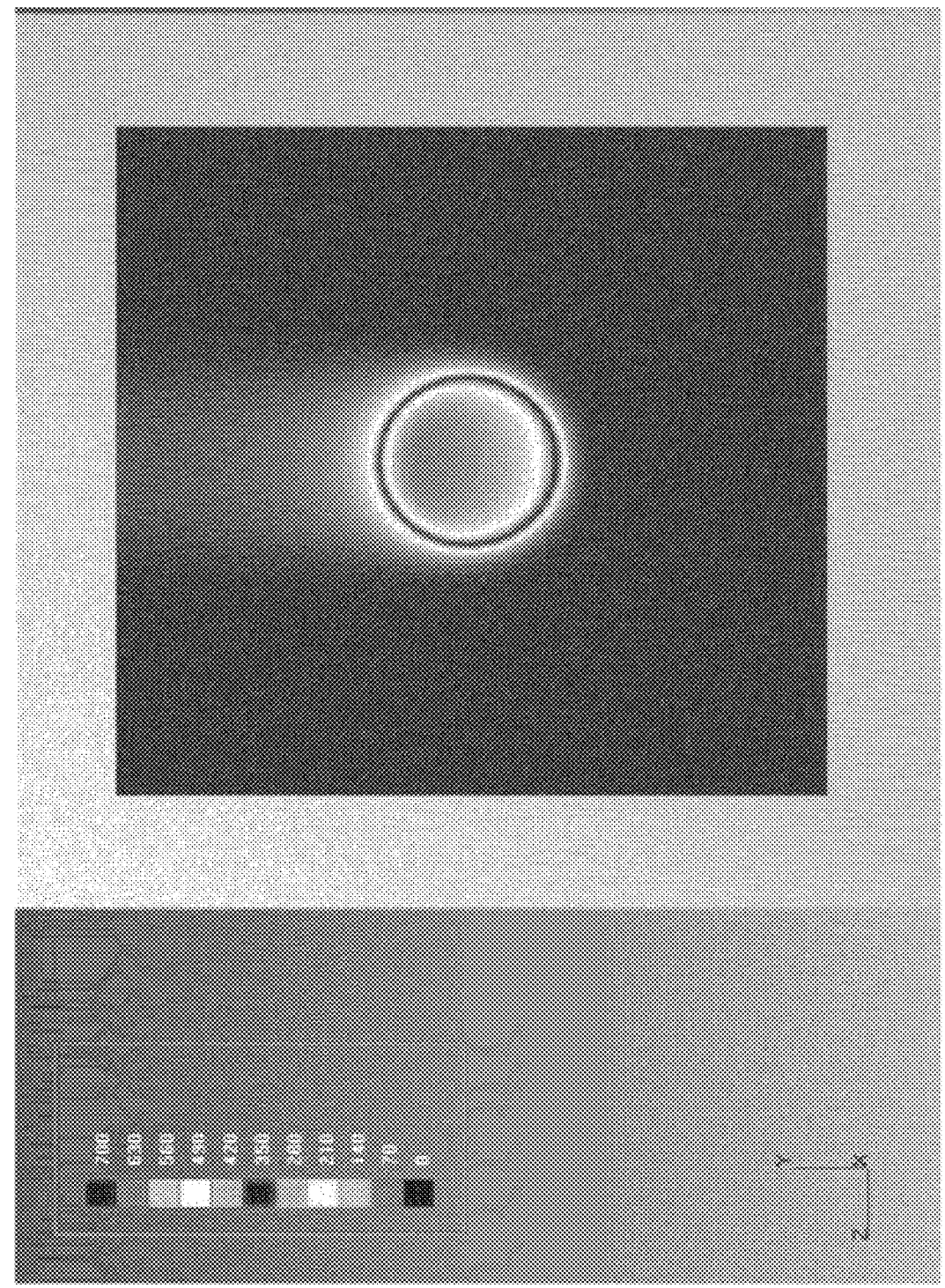

FIG. 4f shows a portion showing a heated temperature when it is not attached to a steel plate.

It can be seen that the temperature at the center portion of the flame increases around 600 degrees when it is not attached to a steel plate.

FIGS. 5a to 5f are views showing heating tests when a wood fiber is attached or not to a steel plate.

The properties and conditions are as follows.

The density, thermal conductivity, and specific heat of the wood fiber are 160 kg/m³, 0.045 W/m·K, and 2100)/kg·K, the thermal conductivity of the adhesive is 3 W/m·K, and it is assumed that the density, thermal conductivity, and specific heat of the steel plate are 7800 kg/m³, 45 W/m·K, and 500 J/kg·K.

Figure 5A:
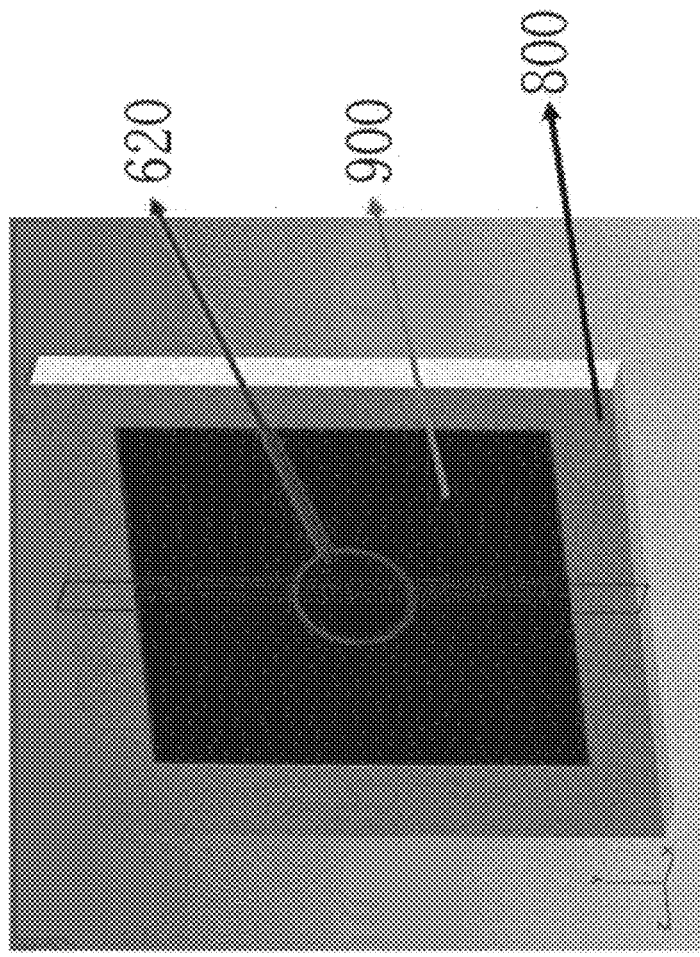
FIGS. 5a to 5f are views showing heating tests when a wood fiber that is a kind of natural fibers is attached or not to a steel plate.

FIG. 5a is entire modeling, in which the heated portion 620 is 20,000 W/m² and the material is a wood fiber 900 of 75×75×0.1 mm³, it is assumed that the surrounding is filled with air 800.

Figure 5B:
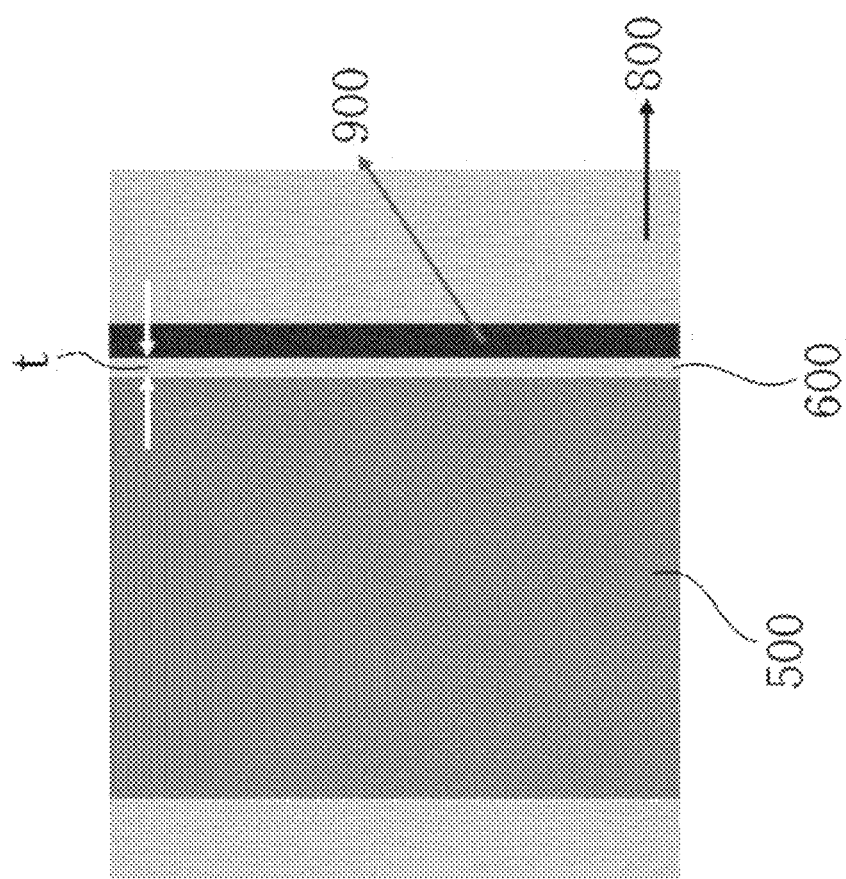

FIG. 5b is an enlarged view of a Z-axial cross-section of FIG. 5a, in which the thickness gap t of an adhesive layer 600 is 0.025 mm, the metal material 500 that is a steel plate has 75×75×0.6 mm³, and the material is the wood fiber 900 of which the size is the same as that of FIG. 5a.

Figure 5C:
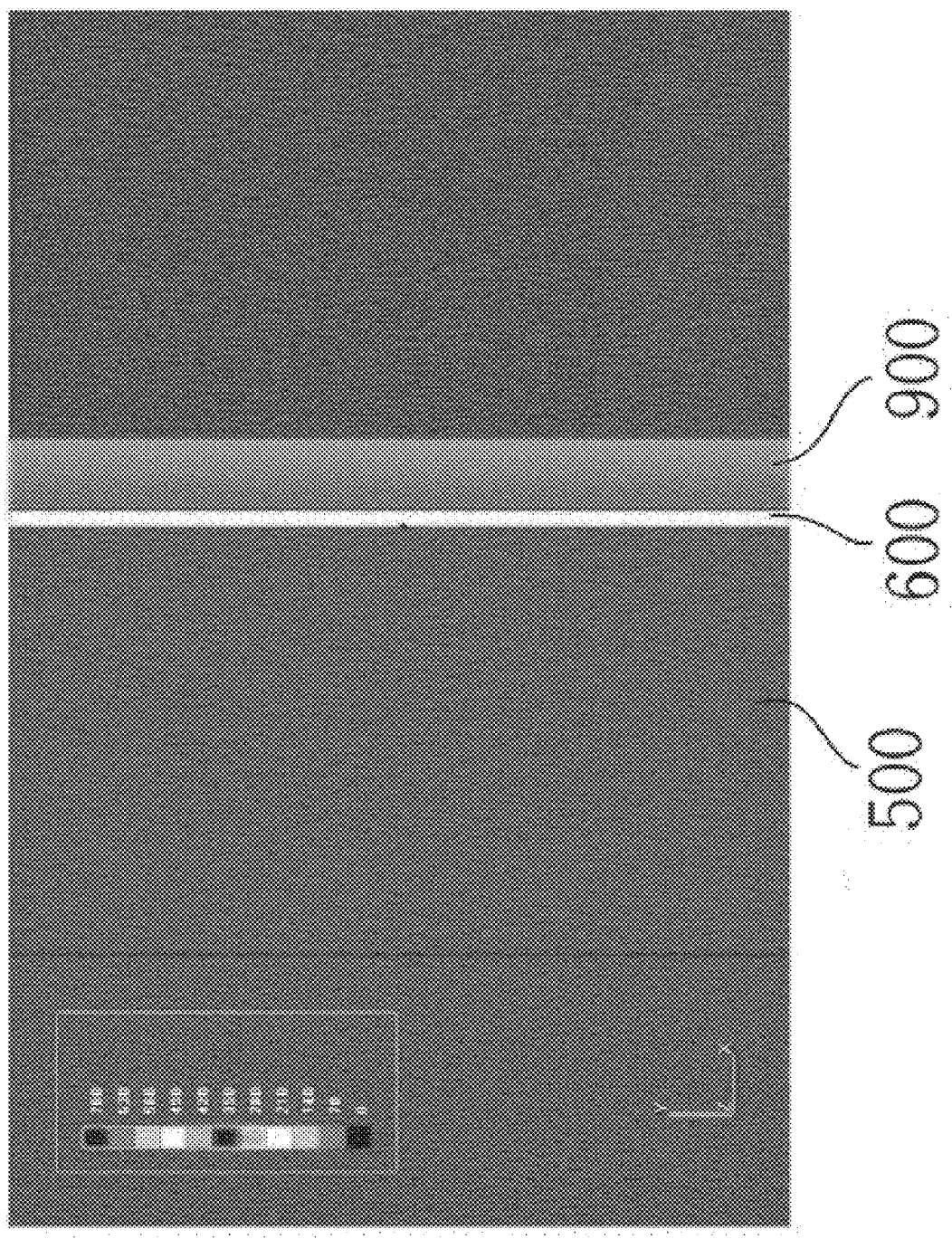

In FIG. 5c, the temperature of the metal material 500 that is the steel plate after heating is 44° C. and the material temperature of the wood fiber 900 is 407.8° C.

Figure 5D:
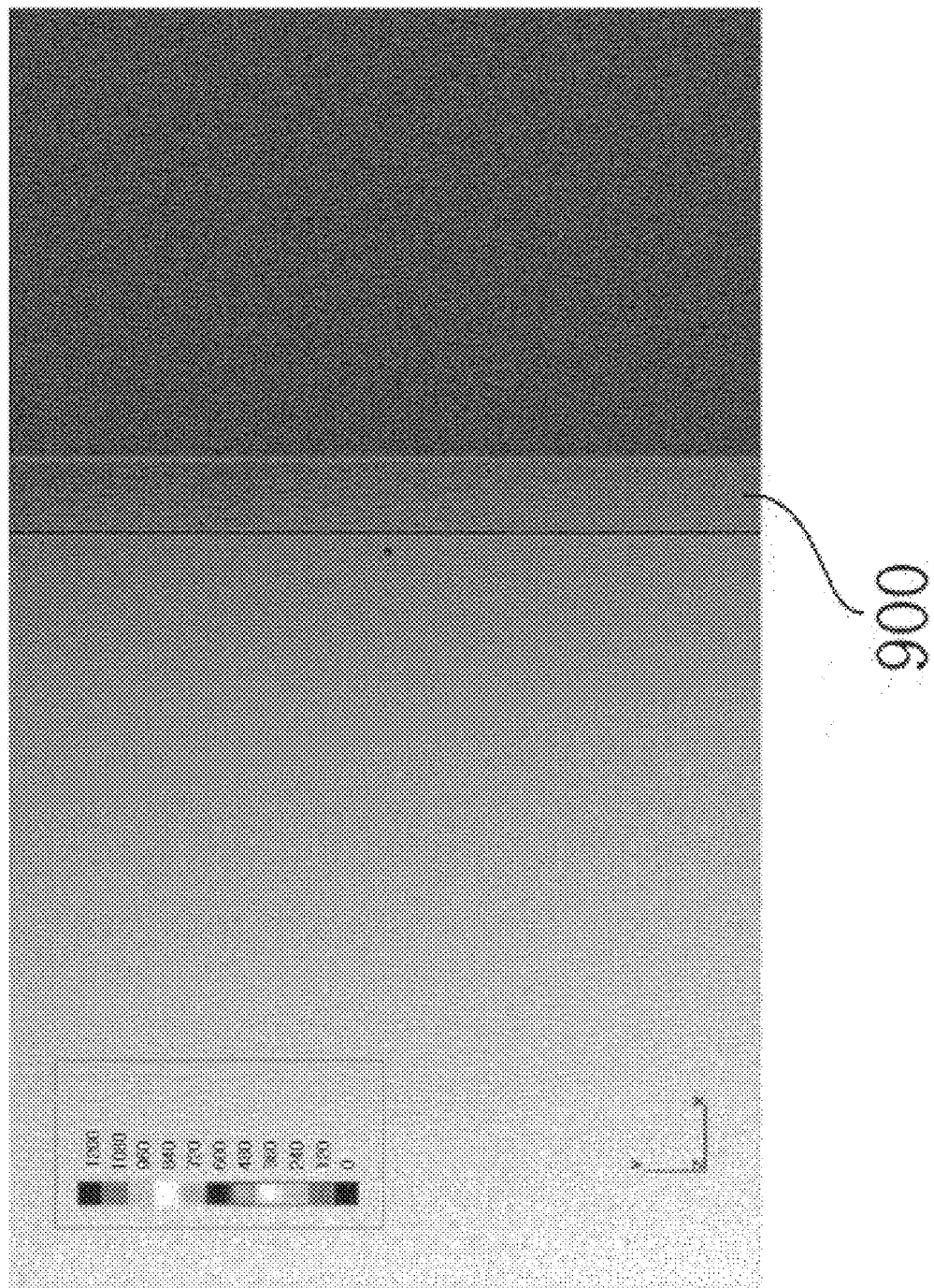

In FIG. 5d, the material temperature of the wood fiber 900 increases up to 1240° C. when it is heated without a steel plate.

Accordingly, it can be seen that the temperature quickly transfers to the steel plate due to the steel plate.

Figure 5E:
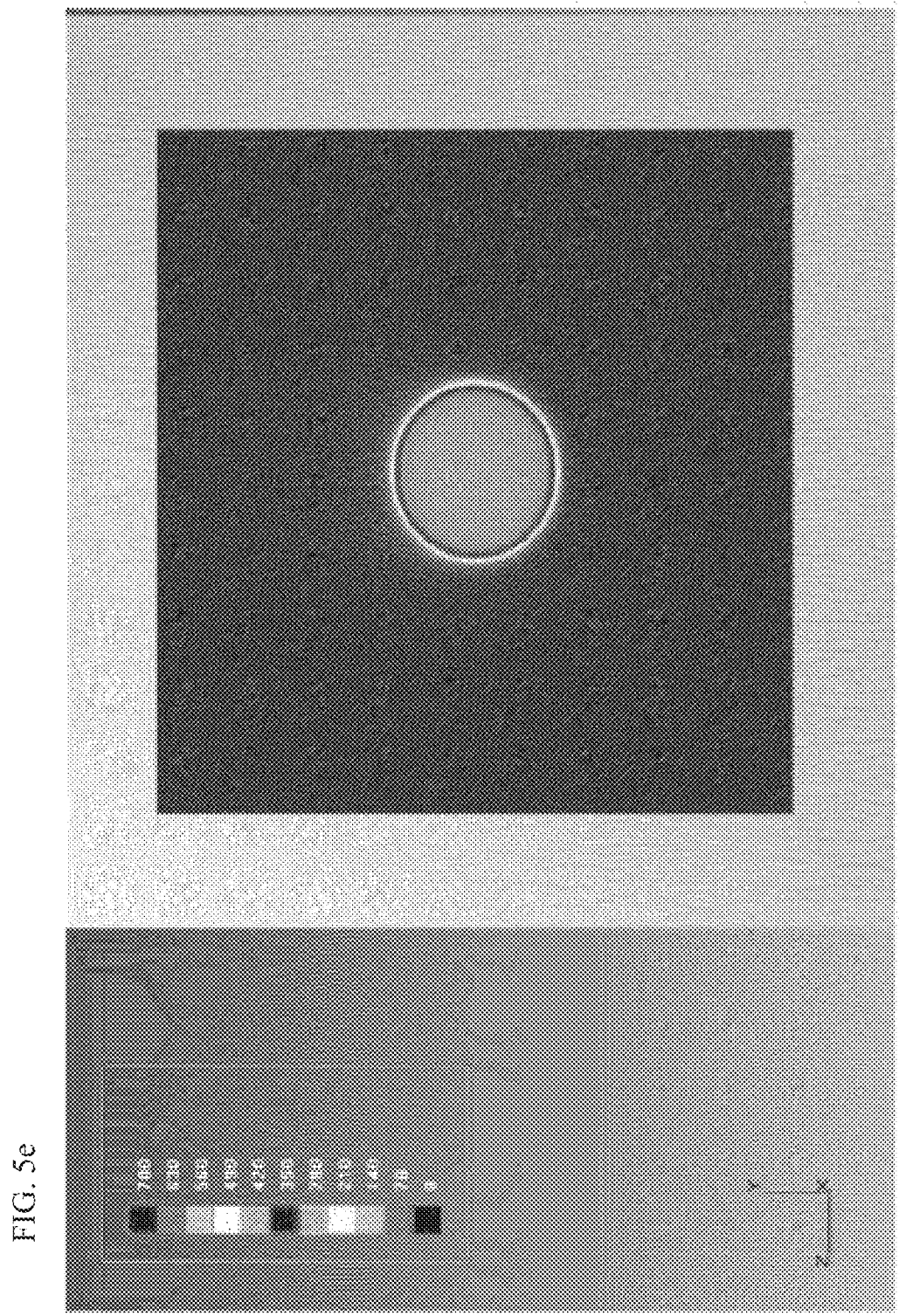

FIG. 5e shows a portion showing a heated temperature when there is a steel plate.

It can be seen that the temperature of the heated portion when there is a steel plate is around 400 degrees.

Figure 5F:
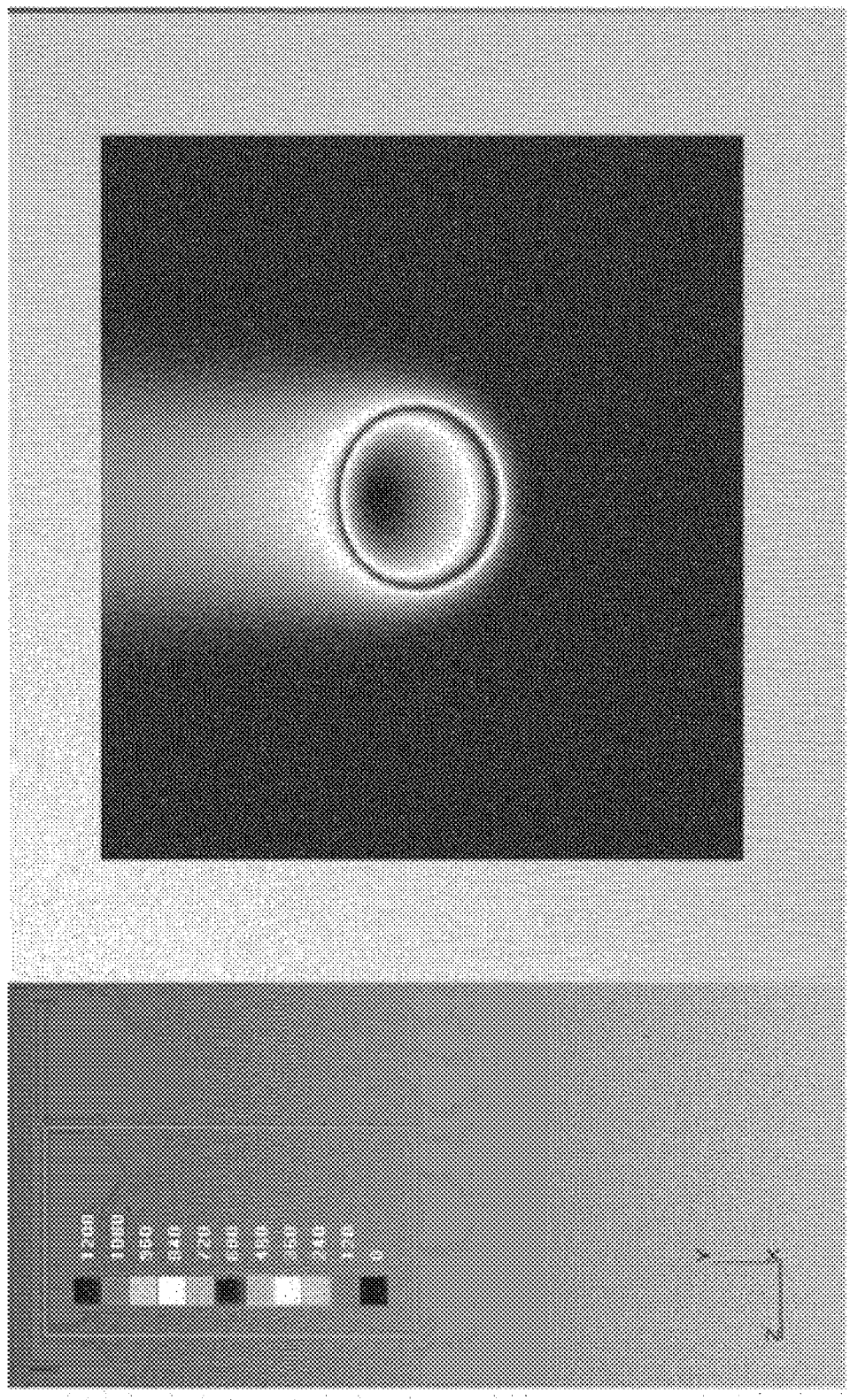

FIG. 5f shows a portion showing a heated temperature when it is not attached to a steel plate.

It can be seen that the heated temperature when there is no steel plate is considerably higher than the heated temperature when a steel plate is attached.

It can be seen that the temperature of the wood fiber is shown by red at the center portion when there is no steel plate and the temperature is around 1200 degrees.

The configuration by the figures and above description is described as follows.

A polyethylene material 700 that is a non-flame-proof-treated thin film sheet is configured on the metal material 500.

A metal material with a flammable thin-film construction interior material 400 composed of the adhesive layer 600 is configured between the metal material 500 and the polyethylene material 700 that is a non-flame-proof-treated thin film sheet.

It is preferable that an adhesive is configured on the rear surface of the polyethylene material 700 that is a non-flame-proof-treated thin film sheet, a release paper is separated, and the adhesive layer 600 is attached to the metal material 500, whereby the metal material with a flammable thin-film construction interior material 400 is configured.

The wood fiber 900 may be applied as the non-flame-proof-treated thin film sheet.

The non-flame-proof-treated thin film sheet may be configured as the wood fiber 900, the polyethylene material 700, or any one selected from a fabric, a cork film, a polymer film, Korean paper, and leather.

Any material can be used as long as it is a flammable material and used as an interior material.

The metal material has only to be a metallic material such as steel, aluminum, copper, and magnesium.

Any material is possible as long as it is metal that transmits heat well.

The metal material 500 is a configuration of a metal plate and the thickness is 0.3t~1.2t, so it has a firm configuration. The thickness may be configured to be different, depending on metal, and may be configured to be different by specifications.

It is preferable that the adhesive layer 600, which is thermosetting resin, is composed of synthetic rubber of any one or more of epoxy, polyester, acryl, vinyl acetate, phenol, urea, melamine, and xylene.

The metal material with a flammable thin-film construction interior material 400 has the following configuration to be attached to a wall.

Figure 6A:
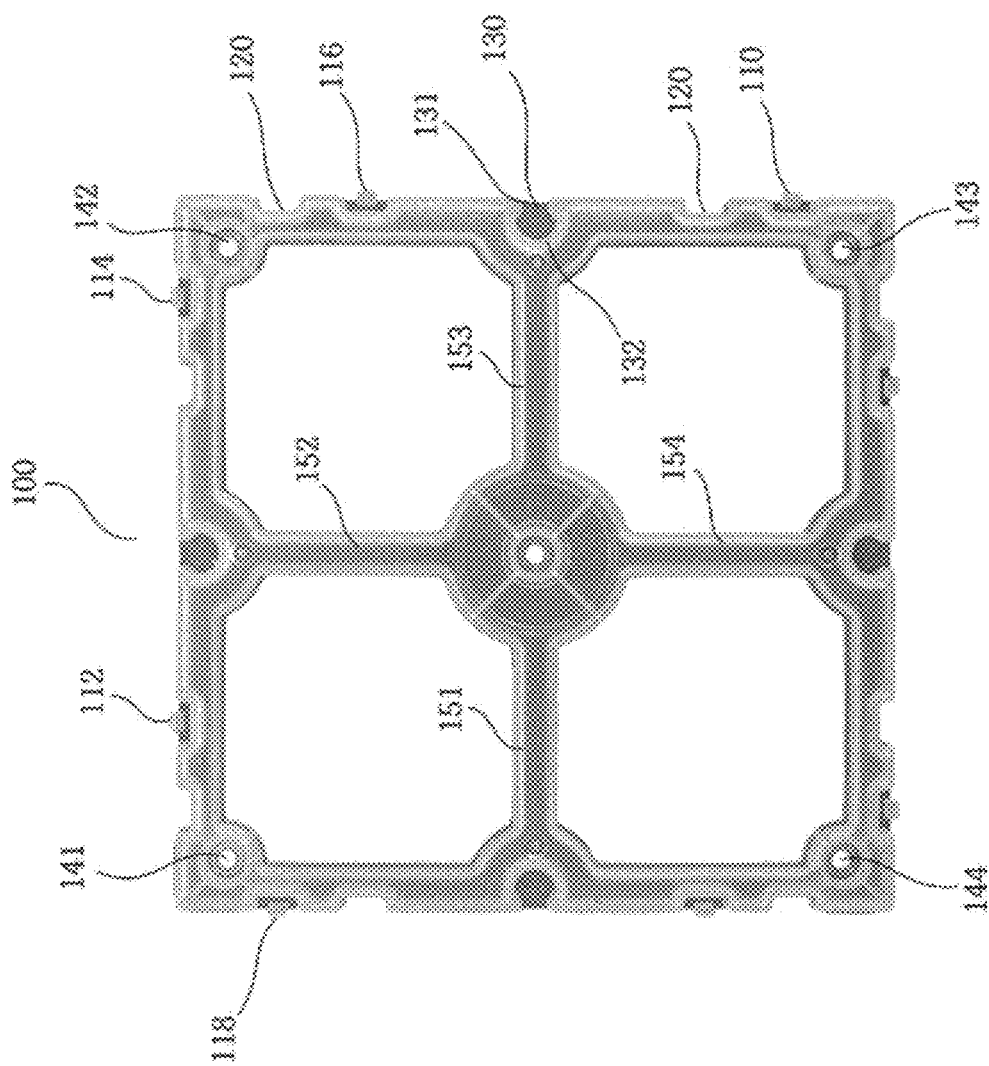
FIG. 6a is a view showing a unit attachment structure.

FIG. 6a is a view showing a unit attachment structure 100.

Figure 6B:
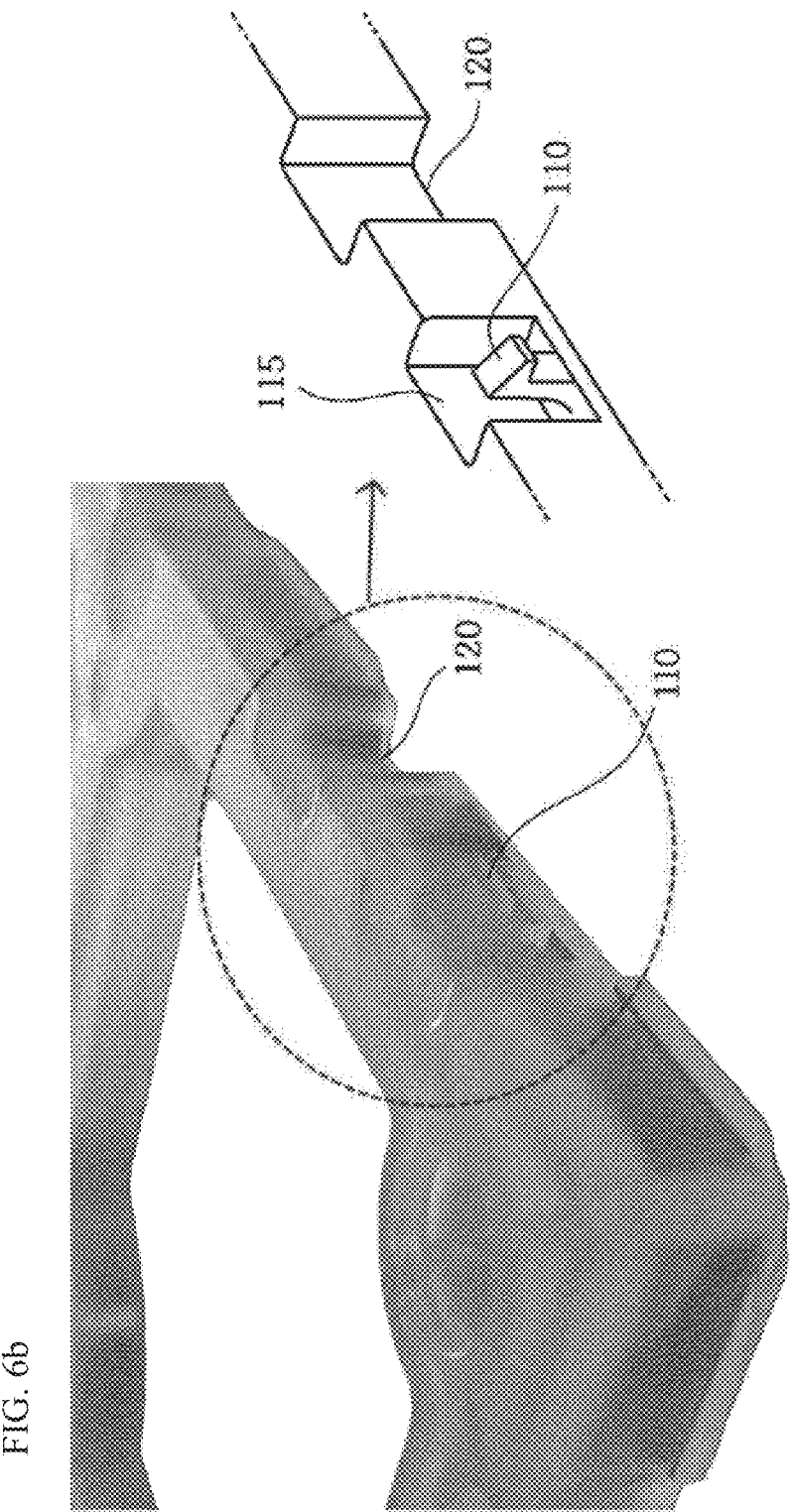
FIG. 6b is a view showing a coupling protrusion.

As show in FIG. 6b, coupling avoidance spaces 115 are configured on the rear surfaces of the coupling protrusions 110, 112, 114, 116, and 118, so it can be coupled well through the avoidance spaces when it is coupled to a metal material.

Figure 7A:
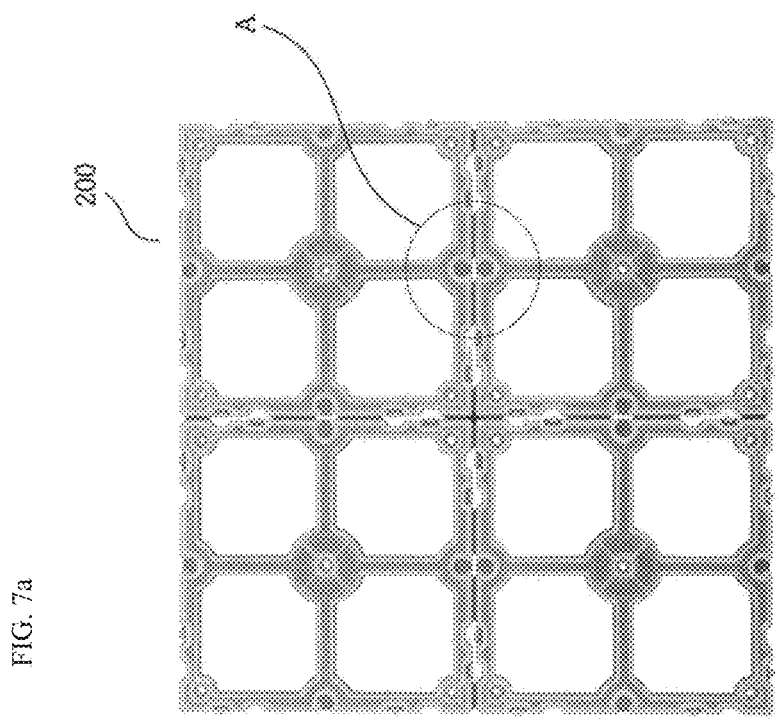
FIG. 7a is a view showing a plurality of unit attachment structures connected and produced at a time in injection molding.
Figure 7B:
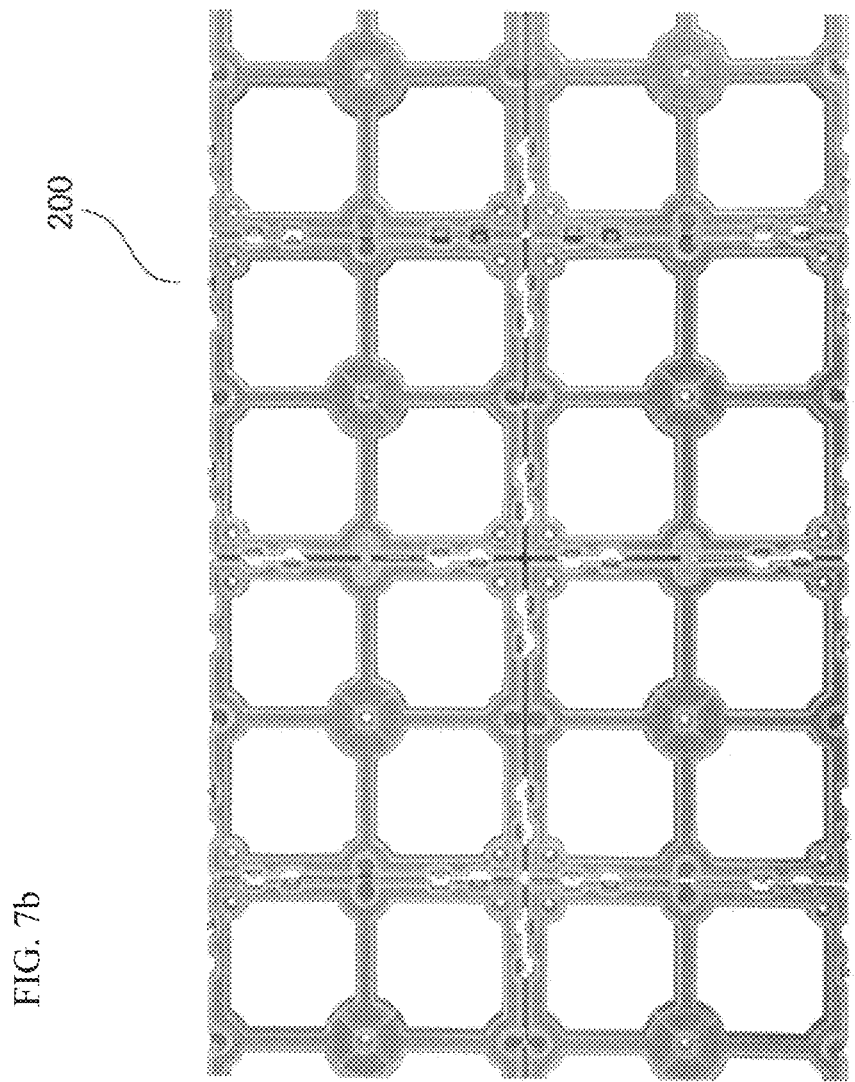
FIG. 7b is a view showing the structures of FIG. 7a connected left and right.

Description referring to FIGS. 7a and 7b is as follows.

In an embodiment, the attachment structure is manufactured in a square shape in the present disclosure, and a unit attachment structure 100 is configured in 15 cm.

If necessary, the specifications may be freely configured in various ways.

Since the attachment structure has many spaces, when a metal material with a flammable thin-film construction interior material is attached, heat is quickly diffused through the spaces, so it has an excellent effect of preventing a fire.

When an adhesive is attached to a wall and there is no space, heat is slowly diffused, which does not greatly help fire prevention.

The present disclosure is used as an interior material for a wall or a ceiling by attaching an interior product made of a flammable material to a tile type metal plate, and a product having excellent flame-proof performance was invented.

FIG. 7a shows that four unit attachment structures 100 are manufactured and configured at a time when they are made of plastic by injection molding. They are connected to each other at the lower portions when they are manufactured as thin plastic by injection molding.

This is for being able to appropriately use a small number of unit attachment structures 100 in working.

FIG. 7b is described hereafter.

In order to attach the attachment structure 100 to a wall, an attachment structure 200 is configured by connecting four unit attachment structures 100 as a set and combining fourth attachment structures using connectors.

When an assembly of the four unit attachment structures 100 are connected with another assembly composed of four unit attachment structures 100 by the connectors, the work time is reduced, so there is an advantage that it is possible to attach the attachment structure to a wall requiring the metal material with a flammable thin-film construction interior material 400.

Although the connectors 300 are separately configured, they may be attached in a male-female type (embossed type) to the attachment structure 100.

In particular, it is preferable to insert the connectors 300 in the connection portion holes 130.

The shape may be varied.

Of course, four units are configured, but, depending on work efficiency, it is possible to connect and injection-mold two, six, eight, or more desired number of unit attachment structures 100.

Figure 7C:
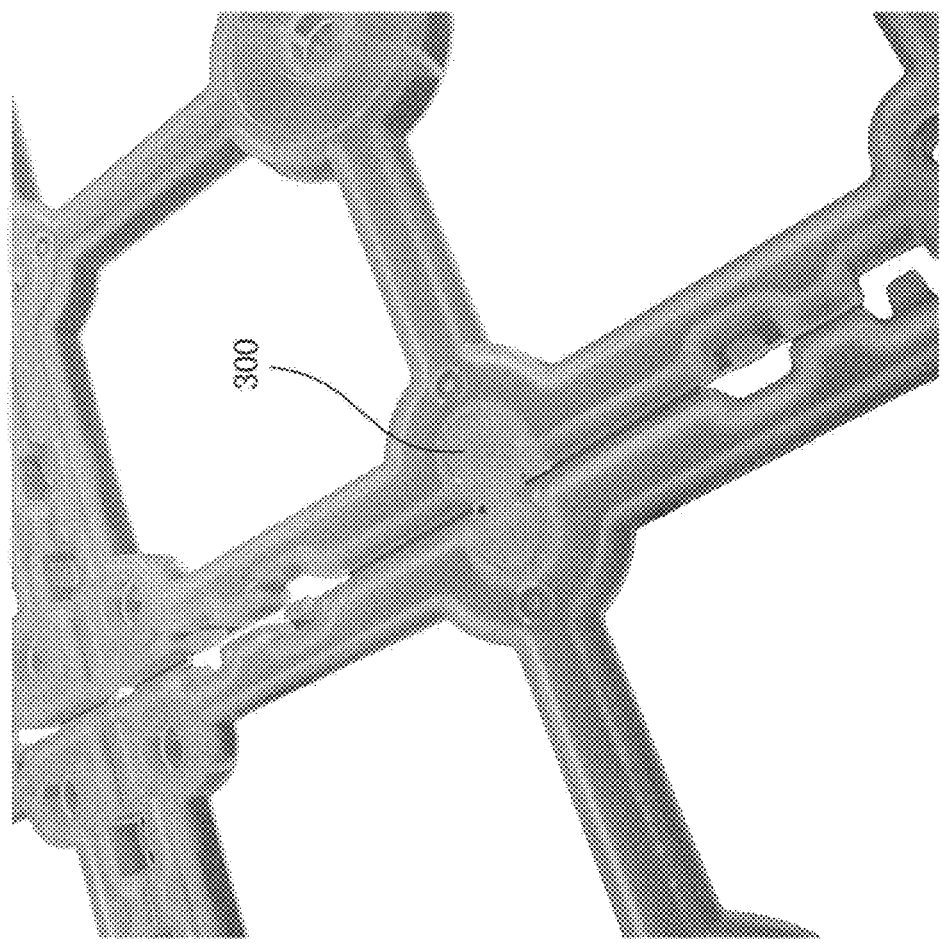
FIG. 7c is a view showing the state in which unit attachment structures are connected through connectors when they are connected left and right.
Figure 7D:
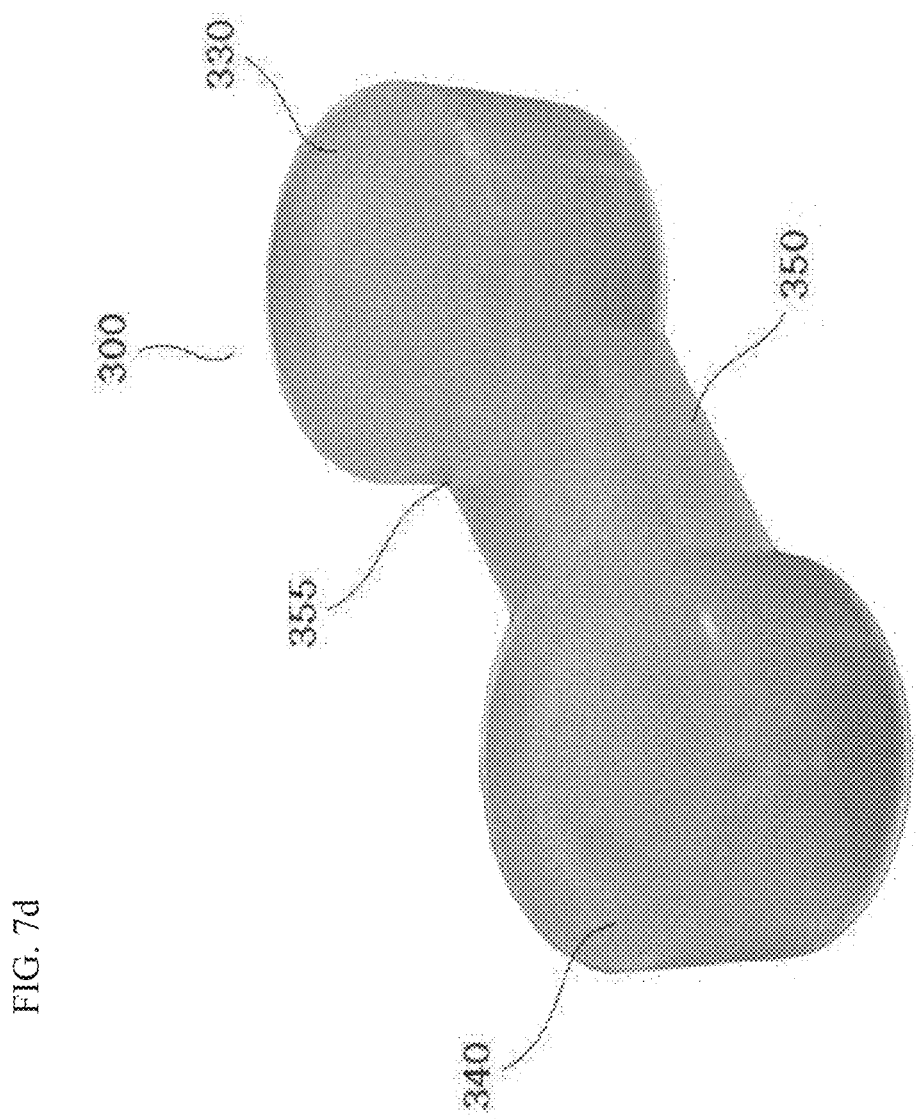
FIG. 7d is a view showing the structure of the connector.

FIGS. 7c and 7d show a method of connecting adjacent attachment structures to each other.

In this case, an insertion end is configured by bending four ends of the metal material 500 in one direction in a right angle shape.

Coupling protrusion holes 410, 420, 440, and 450 are configured at the insertion ends.

The metal material with a flammable thin-film construction interior material has a configuration having connection portion grooves 430 configured adjacent to the coupling protrusion holes 410, 420, 440, and 450.

It is preferable that the metal material 500 has a tile structure to be attached to a ceiling or a wall.

A gap two-times larger than the thickness of the metal material is configured between the attachment structure 100 and another adjacent attachment structure.

For example, the thickness of the metal material is 0.5 mm. Different thickness may be given, depending on what the configuration of the metal material is.

Two metal materials are both coupled to the attachment structure 100, so there should be a spare of 1 mm thickness, and there is a need for a work space for efficient work or, replacement of metal material with a flame-proofed construction interior material 400 or a poor attachment structure 100, so it is preferable that the gap between attachment structures is 2 mm.

FIG. 8 is a view showing that a metal material with a flammable thin-film construction interior material 400 is attached is attached to a wall surface by an attachment structure 100.

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the term to describe most appropriately the best method he or she knows for carrying out the disclosure.

Therefore, the configurations described in the embodiments and drawings of the present disclosure are merely most preferable embodiments but do not represent all of the technical spirit of the present invention. Thus, it should be understood that the present disclosure should be construed as including all the changes, equivalents, and substitutions included in the spirit and scope of the present disclosure at the time of filing this application.

INDUSTRIAL APPLICABILITY

The present disclosure is for preventing a fire of the interior materials of various buildings.

A flame-proofed material is attached to various interior materials in the related art, and the flame-proofed material (b) was observed as having self-extinguishing, but most part was burned, so there is a defect that the flame-proofed material produces noxious gas containing halogen, so the flame-proofed material may cause casualties.

However, it can be seen that not only the steel plate attachment material (c) has self-extinguishing, a trace remains only at the portion corresponding to the diameter of the torch flame.

The burning area of the steel plate attachment material is very smaller than flame-proofed materials of the related art, so it can be seen that the steel plate attachment material has a very excellent characteristic against a fire, and it has very high industrial applicability.

The invention claimed is:

1. A metal plate with a flammable thin-film construction interior material, comprising:
   a metal material,
   wherein the metal material is any one selected from steel, aluminum, copper, and magnesium,
   the metal material is composed of a metal plate,
   the metal plate is configured to have a tile structure to be attached to a ceiling or a wall,
   insertion ends are configured at four ends of the metal plate,
   the insertion ends are configured by bending the four ends in a right-angle shape in one direction,
   coupling protrusion holes are configured at the insertion ends,
   a non-flame-proof-treated thin film sheet is configured on the metal plate,
   the non-flame-proof-treated thin film sheet is one selected from a fabric, a wood film, a cork film, a polymer film, Korean paper, and leather, and
   an adhesive layer is configured between the metal plate and the non-flame-proof-treated thin film sheet.

2. The metal plate with the flammable thin-film construction interior material of claim 1, wherein an adhesive of the adhesive layer is any one or more of epoxy, polyester, acryl, vinyl acetate, phenol, urea, melamine, and xylene.

3. An attachment structure for attaching the metal plate with the flammable thin-film construction interior material of claim 1, the attachment structure comprising:
   insertion portions corresponding to the insertion ends to attach the metal plate with the flammable thin-film construction interior material to the wall; and
   coupling protrusions configured at an outermost portion to couple the coupling protrusion holes configured at the insertion ends,
   wherein the coupling protrusions have coupling avoidance spaces at an opposite side to the coupling protrusions to secure avoidance spaces when being coupled to the metal plate.

4. An attachment structure for attaching the metal plate with the flammable thin-film construction interior material of claim 2, the attachment structure comprising:
   insertion portions corresponding to the insertion ends to attach the metal plate with the flammable thin-film construction interior material to the wall; and
   coupling protrusions configured at an outermost portion to couple the coupling protrusion holes configured at the insertion ends,
   wherein the coupling protrusions have coupling avoidance spaces at an opposite side to the coupling protrusions to secure avoidance spaces when being coupled to the metal plate.

* * * * *